（12）United States Patent
Bowers et al.

(10) Patent No.: US 9,516,485 B1
(45) Date of Patent: Dec. 6, 2016

(54) SYSTEMS AND METHODS FOR MAKING EMERGENCY PHONE CALLS

(71) Applicant: Civiq Smartscapes, LLC, Milford, MA (US)

(72) Inventors: Kyle R. Bowers, Boxborough, MA (US); Parag N. Shah, Carlisle, MA (US)

(73) Assignee: Civiq Smartscapes, LLC, Milford, MA (US)

( * ) Notice: Subject to any disclaimer, the term of this patent is extended or adjusted under 35 U.S.C. 154(b) by 0 days.

(21) Appl. No.: 14/940,485

(22) Filed: Nov. 13, 2015

(51) Int. Cl.
*H04W 4/22* (2009.01)
*H04M 7/00* (2006.01)

(52) U.S. Cl.
CPC .............. *H04W 4/22* (2013.01); *H04M 7/006* (2013.01)

(58) Field of Classification Search
CPC ...................................................... H04W 4/22
USPC .......................................... 455/404.1, 404.2
See application file for complete search history.

(56) References Cited

U.S. PATENT DOCUMENTS

| | | | |
|---|---|---|---|
| 2,029,221 A | 1/1936 | Jackson et al. | |
| 4,923,319 A | 5/1990 | Dent | |
| 5,061,023 A | 10/1991 | Soubliere et al. | |
| 5,415,949 A | 5/1995 | Stone et al. | |
| 5,587,740 A | 12/1996 | Brennan | |
| 5,991,153 A | 11/1999 | Heady et al. | |
| 6,002,240 A | 12/1999 | McMahan et al. | |
| 6,010,065 A | 1/2000 | Ramachandran et al. | |
| 6,210,066 B1 | 4/2001 | Dent | |
| 6,364,761 B1 | 4/2002 | Steinbrecher | |
| 6,384,811 B1 | 5/2002 | Kung et al. | |
| 6,493,440 B2 | 12/2002 | Gromatzky et al. | |
| 6,512,670 B1 | 1/2003 | Boehme et al. | |
| 6,766,005 B1 * | 7/2004 | Grunenwald | H04L 12/14 379/144.05 |
| 6,788,544 B1 | 9/2004 | Barsun et al. | |
| 7,108,445 B2 | 9/2006 | Henriques | |
| 7,157,838 B2 | 1/2007 | Thielemans et al. | |
| 7,195,222 B2 | 3/2007 | Dent | |
| 7,339,782 B1 | 3/2008 | Landes et al. | |
| 7,374,258 B2 | 5/2008 | Bowron | |
| 7,405,926 B2 | 7/2008 | Wu et al. | |
| 7,734,764 B2 | 6/2010 | Weiner et al. | |

(Continued)

FOREIGN PATENT DOCUMENTS

CN 104695733 A 6/2015
WO WO-2015/123142 A1 8/2015

OTHER PUBLICATIONS

City Bridge, LLC, "Link NYC Technical Proposal," submitted Jul. 21, 2014 to the City of New York Department of Information, Technology and Telecommunications in response to Request for Proposals for a Franchise to Install, Operate and Maintain Public Communications Structures (248 pages).

(Continued)

*Primary Examiner* — Christopher M Brandt
(74) *Attorney, Agent, or Firm* — Goodwin Procter LLP

(57) ABSTRACT

Systems and method are described for making emergency phone calls using a personal communication structure (PCS). In one example, the PCS includes a telephone, an emergency call button, and a controller. When the emergency call button is pressed, the controller is configured to: (i) terminate an existing call being made on the telephone; (ii) place an emergency call using the telephone to a public safety answering point; and (iii) prevent the emergency call from being terminated at the PCS.

23 Claims, 28 Drawing Sheets

(56) References Cited

U.S. PATENT DOCUMENTS

| | | | |
|---|---|---|---|
| 7,748,681 B2 | 7/2010 | Dent | |
| 7,894,194 B2 | 2/2011 | Shih et al. | |
| 7,980,533 B1 | 7/2011 | Anderson et al. | |
| 7,985,139 B2 | 7/2011 | Lind et al. | |
| 8,006,435 B2 | 8/2011 | DeBlonk et al. | |
| 8,037,651 B2 | 10/2011 | Dent | |
| 8,108,724 B2 | 1/2012 | Barlow et al. | |
| 8,125,163 B2 | 2/2012 | Dunn et al. | |
| 8,154,768 B2 | 4/2012 | Muraki | |
| 8,189,134 B2 | 5/2012 | LeCave | |
| 8,208,115 B2 | 6/2012 | Dunn | |
| 8,212,959 B2 | 7/2012 | Moscovitch et al. | |
| 8,274,622 B2 | 9/2012 | Dunn | |
| 8,281,531 B2 | 10/2012 | Dent | |
| 8,297,067 B2 | 10/2012 | Keisling et al. | |
| 8,310,824 B2 | 11/2012 | Dunn et al. | |
| 8,321,052 B2 | 11/2012 | Yepez et al. | |
| 8,323,089 B2 | 12/2012 | Nagano | |
| 8,345,845 B2 | 1/2013 | Boyce et al. | |
| 8,350,799 B2 | 1/2013 | Wasinger et al. | |
| 8,351,013 B2 | 1/2013 | Dunn et al. | |
| 8,351,014 B2 | 1/2013 | Dunn | |
| 8,358,397 B2 | 1/2013 | Dunn | |
| 8,369,083 B2 | 2/2013 | Dunn et al. | |
| 8,373,841 B2 | 2/2013 | Dunn | |
| 8,379,182 B2 | 2/2013 | Dunn | |
| 8,427,007 B2 | 4/2013 | Jansma et al. | |
| 8,439,761 B2 | 5/2013 | O'Keene et al. | |
| 8,472,174 B2 | 6/2013 | Idems et al. | |
| 8,482,695 B2 | 7/2013 | Dunn | |
| 8,497,972 B2 | 7/2013 | Dunn et al. | |
| 8,508,155 B2 | 8/2013 | Schuch | |
| 8,548,422 B2 * | 10/2013 | Jenkins | H04M 11/045 379/38 |
| 8,569,910 B2 | 10/2013 | Dunn et al. | |
| 8,606,428 B2 | 12/2013 | Chan | |
| 8,649,170 B2 | 2/2014 | Dunn et al. | |
| 8,654,302 B2 | 2/2014 | Dunn et al. | |
| 8,700,226 B2 | 4/2014 | Schuch et al. | |
| 8,711,321 B2 | 4/2014 | Dunn et al. | |
| 8,713,377 B2 | 4/2014 | Nuthi | |
| 8,749,749 B2 | 6/2014 | Hubbard | |
| 8,755,021 B2 | 6/2014 | Hubbard | |
| 8,767,165 B2 | 7/2014 | Dunn | |
| 8,767,923 B1 * | 7/2014 | Edwards | H04M 1/72536 379/39 |
| 8,773,633 B2 | 7/2014 | Dunn et al. | |
| 8,804,091 B2 | 8/2014 | Dunn et al. | |
| 8,823,916 B2 | 9/2014 | Hubbard et al. | |
| 8,854,572 B2 | 10/2014 | Dunn | |
| 8,854,595 B2 | 10/2014 | Dunn | |
| 8,927,909 B2 | 1/2015 | Le Neel et al. | |
| 8,988,647 B2 | 3/2015 | Hubbard | |
| 9,030,641 B2 | 5/2015 | Dunn | |
| 9,072,166 B2 | 6/2015 | Dunn et al. | |
| 9,116,263 B2 | 8/2015 | Hayden, Sr. | |
| 2001/0032918 A1 | 10/2001 | Barnes et al. | |
| 2003/0080949 A1 | 5/2003 | Ditzik | |
| 2004/0187505 A1 | 9/2004 | Hoff et al. | |
| 2004/0203570 A1 * | 10/2004 | Berger | H04M 1/05 455/404.1 |
| 2005/0038749 A1 | 2/2005 | Fitch et al. | |
| 2005/0166482 A1 | 8/2005 | Leahy et al. | |
| 2005/0210331 A1 | 9/2005 | Connelly et al. | |
| 2006/0059790 A1 | 3/2006 | Yeung | |
| 2006/0117085 A1 | 6/2006 | Nagao et al. | |
| 2006/0218828 A1 | 10/2006 | Schrimpf et al. | |
| 2006/0220895 A1 * | 10/2006 | Arcaria | G08B 5/36 340/815.4 |
| 2006/0228165 A1 | 10/2006 | Yonan | |
| 2006/0244700 A1 | 11/2006 | Sano et al. | |
| 2007/0060097 A1 * | 3/2007 | Edge | H04L 65/4007 455/404.1 |
| 2007/0082651 A1 * | 4/2007 | Loizeaux | H04M 1/72541 455/404.1 |
| 2007/0103866 A1 | 5/2007 | Park | |
| 2007/0170237 A1 | 7/2007 | Neff | |
| 2007/0183849 A1 | 8/2007 | Rock | |
| 2007/0263610 A1 * | 11/2007 | Mitchell | H04L 12/66 370/356 |
| 2008/0053129 A1 | 3/2008 | Follette et al. | |
| 2008/0113821 A1 | 5/2008 | Beadell et al. | |
| 2008/0181385 A1 * | 7/2008 | Eveland | H04W 4/18 379/219 |
| 2008/0204556 A1 | 8/2008 | de Miranda et al. | |
| 2008/0204982 A1 | 8/2008 | Wu et al. | |
| 2008/0255901 A1 | 10/2008 | Carroll et al. | |
| 2009/0003312 A1 * | 1/2009 | Velazquez | H04M 3/5116 370/352 |
| 2009/0149153 A1 * | 6/2009 | Lee | H04M 1/72541 455/404.1 |
| 2009/0231807 A1 | 9/2009 | Bouissiere | |
| 2009/0241388 A1 | 10/2009 | Dunn | |
| 2009/0280770 A1 * | 11/2009 | Mahendran | H04L 29/12594 455/404.1 |
| 2010/0149736 A1 | 6/2010 | Dittmer et al. | |
| 2010/0222132 A1 | 9/2010 | Sanford et al. | |
| 2011/0226505 A1 | 9/2011 | Mackin | |
| 2011/0274093 A1 * | 11/2011 | Sing | H04W 48/12 370/338 |
| 2012/0262271 A1 | 10/2012 | Torgersrud et al. | |
| 2013/0147626 A1 | 6/2013 | Hammoud | |
| 2013/0237175 A1 * | 9/2013 | Piett | H04W 4/12 455/404.1 |
| 2015/0244297 A1 | 8/2015 | Niemoeller et al. | |

OTHER PUBLICATIONS

CityBridge & LinkNYC Media Data Sheet, available at <http://civiqsmartscapes.com/img/solutions/LinkNYC-Media-Kit.pdf>, published Mar. 2015 (13 pages).

* cited by examiner

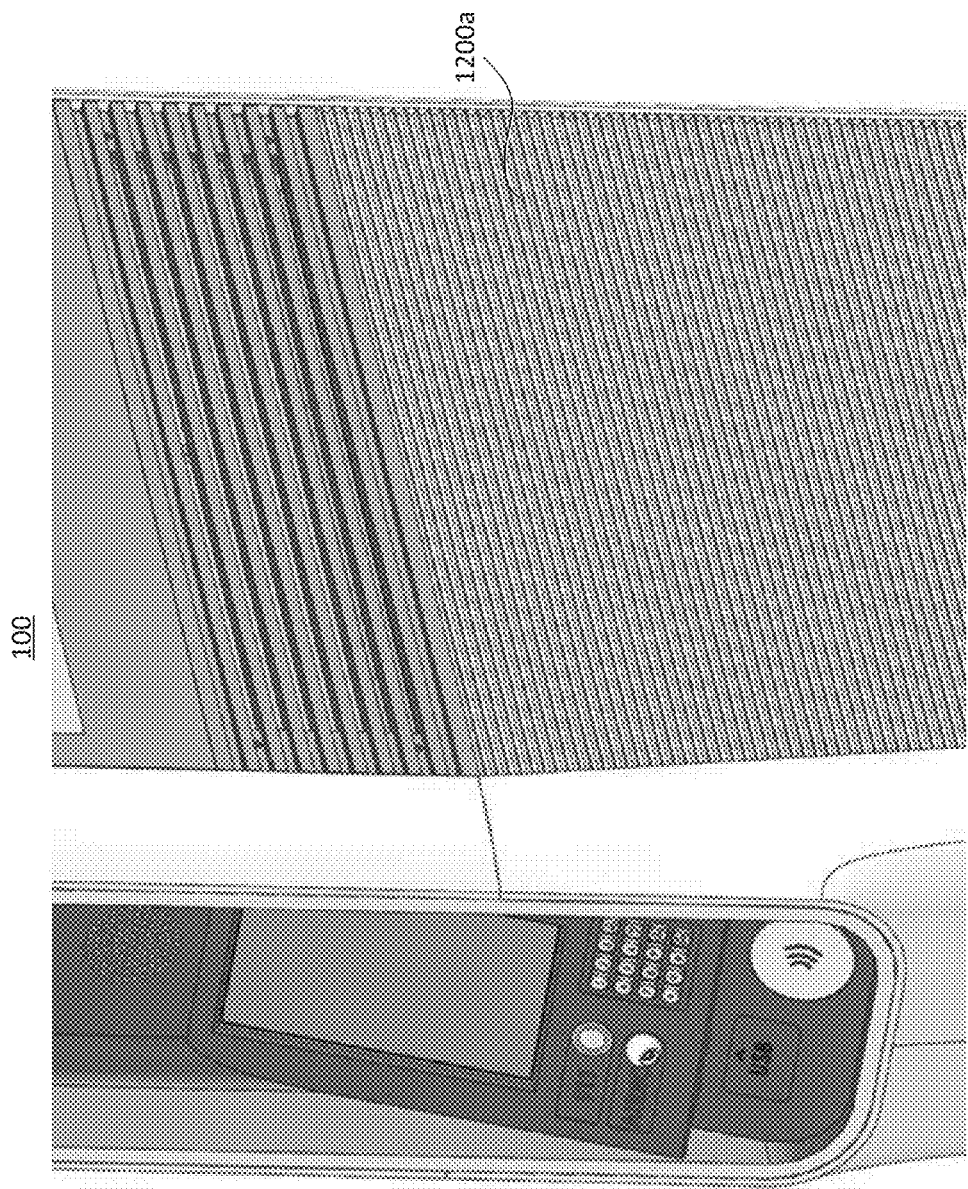

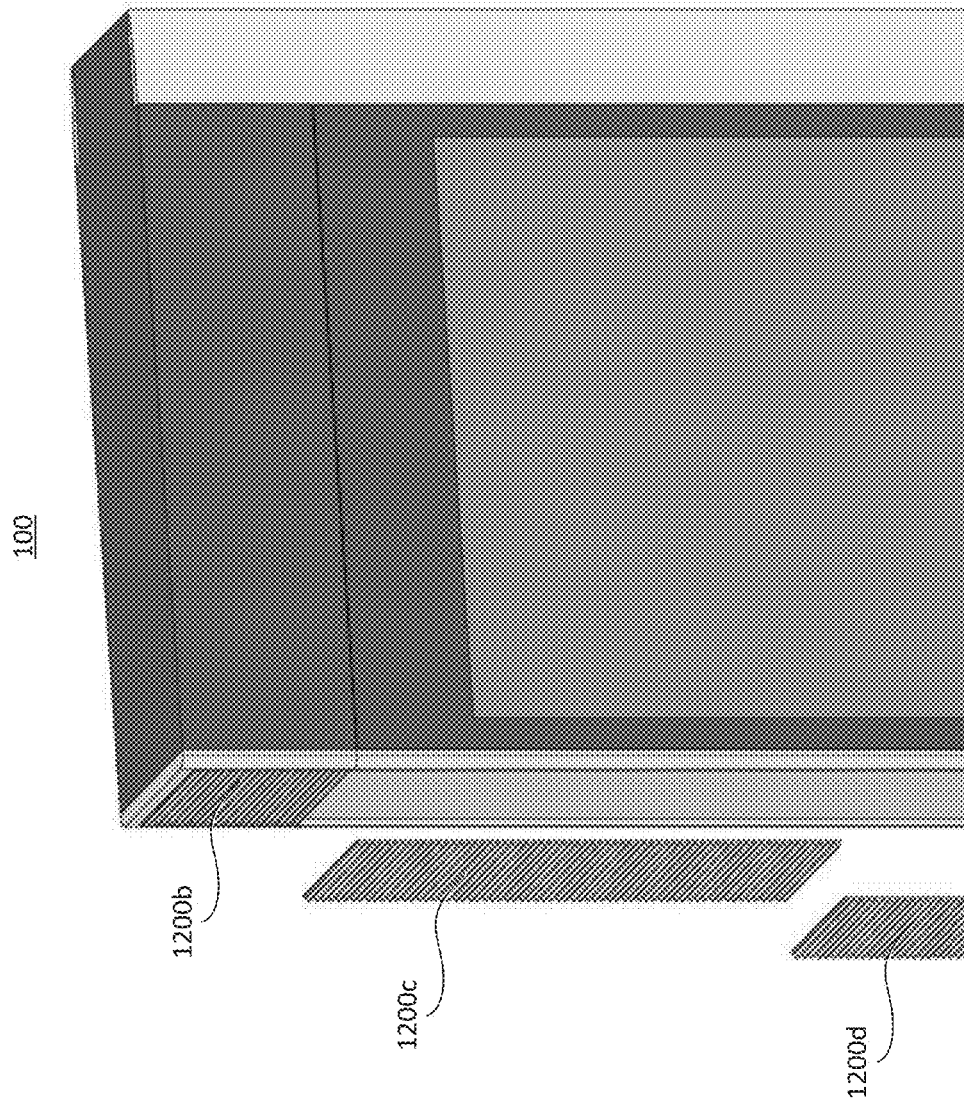

SYSTEMS AND METHODS FOR MAKING EMERGENCY PHONE CALLS

FIELD OF INVENTION

The present disclosure relates generally to techniques and apparatus for making emergency phone calls from a personal communication structure (PCS). Some embodiments relate specifically to systems and methods for connecting a user of the PCS with a public safety answering point (PSAP) and exchanging information with the PSAP.

BACKGROUND

In recent years, public telephone booths have dwindled in number and many of the remaining booths have fallen into relative disuse and disrepair. The demise of the public telephone booth can be traced, in part, to the increasing prevalence of mobile phones and to the widespread use of communication networks for non-telephonic purposes. Many people who wish to participate in telephone conversations in public places prefer the convenience of their own mobile phones to the inconvenience of a stationary phone booth. Furthermore, in contrast to many mobile phones, conventional public telephone booths do not allow users to access Internet-based data and services. Many people who wish to access Internet-based data and services in public places use mobile computing devices (e.g., smartphones or laptop computers) and wireless networks (e.g., mobile broadband networks or Wi-Fi networks) to do so. In short, for many people, the public telephone booth is less convenient and less functional than other readily available options for connecting to a communication network.

Despite the seeming ubiquity of mobile computing devices, many people are often left with insufficient access to telephonic or Internet-based services. In some areas, wireless network coverage may be poor or nonexistent. In areas where wireless networks are available, the number of network users or the volume of network traffic may exceed the capacity of the network, leaving some users unable to connect to the network, and degrading quality of service for users who are able to connect (e.g., degrading audio quality of phone calls or reducing rates of data communication). Even when wireless networks are available and not congested, some people may not have access to telephonic or Internet-based services because they may not have suitable computing devices or network-access agreements (e.g., a person may not own a computing device, may own a computing device but not have a network-access agreement with an Internet-service provider, may not own a mobile computing device, may have a mobile computing device with an uncharged battery, etc.).

Access to a telephone during an emergency, to contact emergency responders, can mean the difference between life and death. Most college campuses and many public locations have 911 "call boxes" that allow users to dial 911 in the event of an emergency. Public pay telephones may also be used for this purpose. For example, when hurricane Sandy struck New York City in 2012, power to the city and some of the cell towers was lost, but the public pay phones remained working on an existing 48-volt infrastructure. As battery powered phones went dead, citizens were able to make emergency phone calls using the public pay phone system.

SUMMARY OF THE INVENTION

Embodiments of this disclosure relate to a system and method for providing E911 call service in a personal communications structure (PCS). The PCS has a voice and video calling station and an E911 system that provides calls for help in emergency situations. The E911 call can be placed through wireless communications, a conventional telephone wireline, and/or over an Internet connection. The PCS is also able to transmit location information. The PCS preferably includes sensors (e.g., a microphone and a camera) for system and environment monitoring. The PCS may also include an intelligent power system that contains battery back-up for the E911 system.

One aspect of the present disclosure relates to a method of placing an emergency phone call. The method includes: providing a communication structure having a telephone and an emergency call button; receiving an indication that a user of the communication structure has pressed the emergency call button, and, in response: terminating an existing call being made on the telephone; placing an emergency call using the telephone to a public safety answering point; and preventing the emergency call from being terminated at the communication structure.

In certain embodiments, the communication structure is accessible to the general public. The telephone may include a wireline telephone, a wireless telephone, and/or a voice over Internet protocol telephone. Preventing the emergency call from being terminated may include inactivating at least one button associated with the communication structure. In some instances, in response to a premature termination of the emergency call, the method may include receiving a call-back from the public safety answering point at the telephone. The communication structure may be configured with a call-back number and/or a call-back time period.

In certain examples, the method also includes determining that a wireless communication system is not available, and, in response, placing the emergency call using voice over Internet protocol. In some embodiments, the method also includes: receiving an instruction from the public safety answering point, the instruction including advice for handling an emergency associated with the emergency call; and presenting the instruction on a display of the communication structure. The instruction may include, for example, an image and/or a video. In various implementations, the method also includes: obtaining an image or a video using a camera in communication with the communication structure; and sending the image or the video to the public safety answering point.

Another aspect of the present disclosure relates to a communication structure that includes: a telephone; an emergency call button; and a controller. When the emergency call button is pressed, the controller is configured to: (i) terminate an existing call being made on the telephone; (ii) place an emergency call using the telephone to a public safety answering point; and (iii) prevent the emergency call from being terminated at the communication structure.

In certain examples, the communication structure is accessible to the general public. The telephone may include a wireline telephone, a wireless telephone, and/or a voice over Internet protocol telephone. In some instances, to prevent the emergency call from being terminated, the controller is configured to inactivate at least one button associated with the communication structure. In certain embodiments, when the emergency call is prematurely terminated, the communication structure is configured to receive a call-back from the public safety answering point at the telephone. The communication structure may be configured with a call-back number and/or a call-back time period.

In various embodiments, when a wireless communication system is not available, the communication structure is configured to place the emergency call using voice over Internet protocol. The communication structure may include a display and may be configured to (i) receive an instruction from the public safety answering point (e.g., including advice for handling an emergency associated with the emergency call) and (ii) present the instruction on the display. The instruction may include, for example, an image and/or a video.

In some examples, the communication structure includes a camera for obtaining an image or a video of a scene near the communication structure. The communication structure may be configured to send the image or the video to the public safety answering point. In various implementations, the communication structure includes a display module (e.g., an advertising panel) configured to present an indication that an emergency phone call is in process. In certain embodiments, the communication structure is configured to maintain other services (e.g., small cell service, Wi-Fi service, and/or an advertising service) when an emergency phone call is placed.

Other aspects and advantages of the invention will become apparent from the following drawings, detailed description, and claims, all of which illustrate the principles of the invention, by way of example only.

BRIEF DESCRIPTION OF THE DRAWINGS

Certain advantages of some embodiments may be understood by referring to the following description taken in conjunction with the accompanying drawings. In the drawings, like reference characters generally refer to the same parts throughout the different views. Also, the drawings are not necessarily to scale, emphasis instead generally being placed upon illustrating principles of some embodiments of the invention.

FIGS. 12A and 12B show front perspective views of a PCS with ribbed panels, in accordance with some embodiments;

DETAILED DESCRIPTION

Overview of Personal Communication Structure (PCS)

Figure 1:
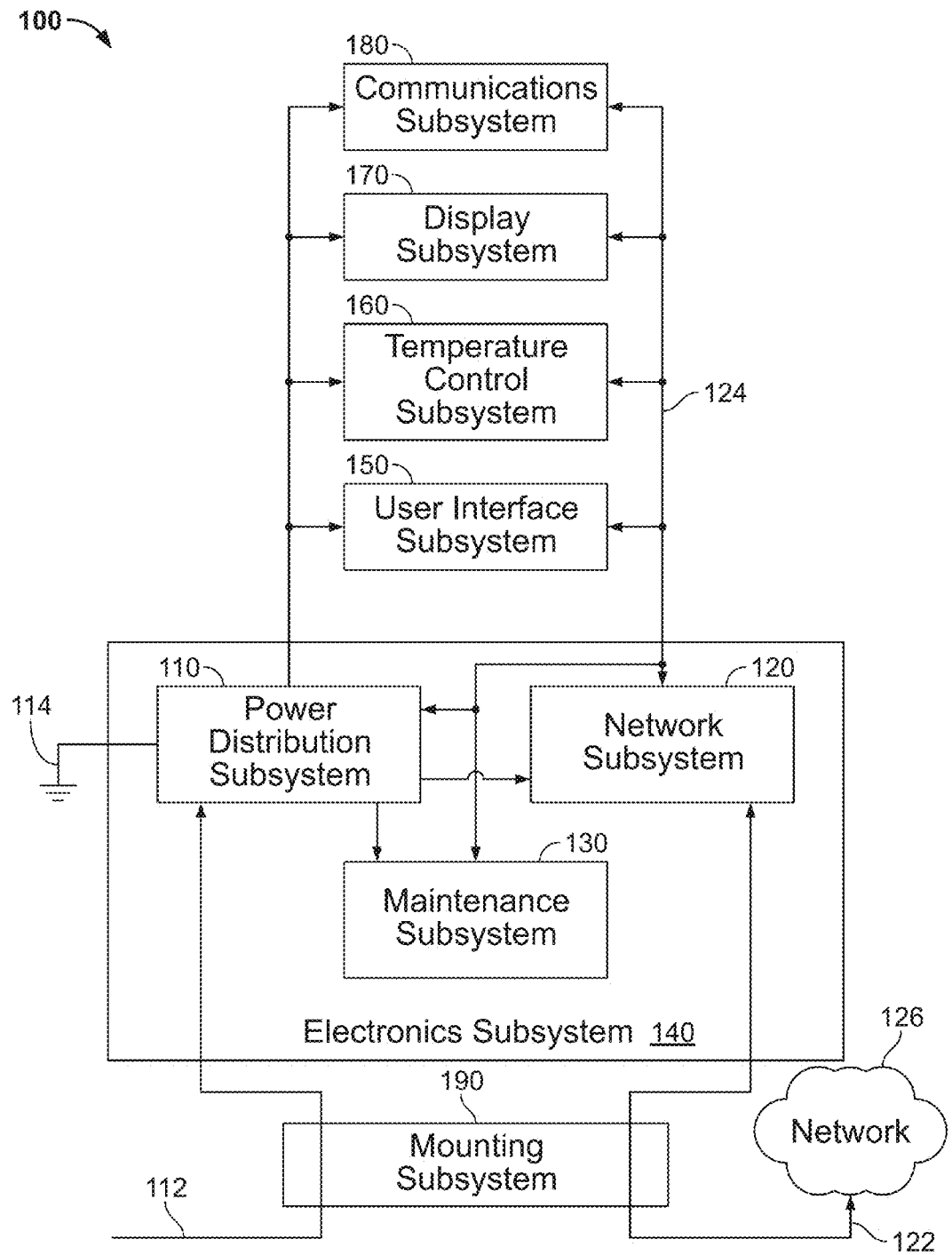
FIG. 1 is a block diagram of a personal communication structure (PCS), in accordance with some embodiments.

FIG. 1 illustrates a personal communication structure (PCS) 100, according to some embodiments. PCS 100 enhances access to communication networks in public or semi-public places. In some embodiments, PCS 100 includes an electronics subsystem 140, a user interface subsystem 150, a temperature control subsystem 160, a display subsystem 170, a communications subsystem 180, and/or a mounting subsystem 190. Electronics subsystem 140 may include a power distribution subsystem 110, a network subsystem 120, and/or a maintenance subsystem 130. These and other components of PCS 100 are described in further detail below.

Power distribution subsystem 110 distributes electrical power to components of PCS 100. Power distribution subsystem 100 may provide power to network subsystem 120, maintenance subsystem 130, other components of electronics subsystem 140, user interface subsystem 150, temperature control subsystem 160, display subsystem 170, and/or communications subsystem 180. Power distribution subsystem 110 may distribute power provided by any suitable power source(s) including, without limitation, batteries, solar panels, a power line 112 coupled to a power grid, etc. In some embodiments, power distribution subsystem 110 includes one or more power converters operable to convert power from one form (e.g., AC power) into another form (e.g., DC power) suitable for the PCS's components. In some embodiments, power distribution subsystem 110 includes one or more voltage level converters operable to change the voltage level of a signal to a level compatible with a component of the PCS. The ground terminal of the power distribution subsystem 110 may be coupled to a reference potential 114 via the chassis of the PCS or via any other suitable path.

Figure 2:
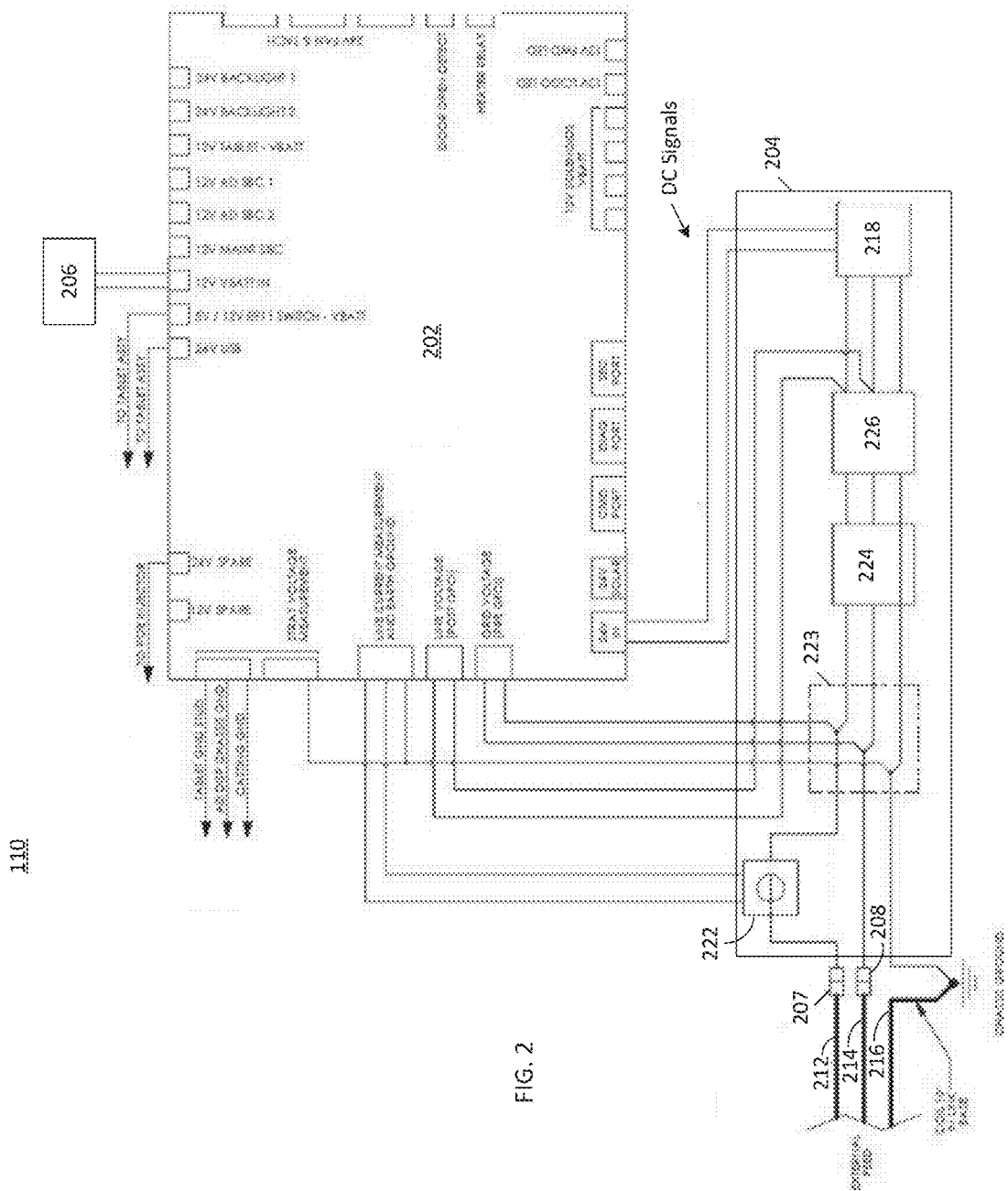
FIG. 2 is a schematic of a power distribution subsystem of a PCS, in accordance with some embodiments.

FIG. 2 shows a schematic of a power distribution subsystem 110, according to some embodiments. In some embodiments, power distribution subsystem (PDS) 110 includes a power conversion system 204, a power distribution board 202, and a battery 206. The inputs to power conversion system 204 include AC power supply signals (e.g., 120 VAC at 60 Hz) carried on a hot line 212, a neutral line 214, and a ground line 216. In some embodiments, the hot line 212 and neutral line 214 may be coupled to power conversion system 204 by quick disconnect devices 207 and 208, respectively, whereby the hot and neutral lines may be safely disconnected from power distribution subsystem 110 if the PCS is separated from its footing. Ground line 216 may be coupled to a ground terminal of the PCS 100. Power conversion system 204 processes the AC power supply signals and converts the processed signals into DC power supply signals. In some embodiments, power conversion system 204 includes a current transformer 222, AC power distribution unit 223, ground-fault circuit interrupter 224 (e.g., circuit breakers), AC line filter 226, and rectifier 218. Rectifier 218 may function as a DC power supply (e.g., a 24 V, 75 A, 2 kW DC power supply). As can be seen in FIG. 2, the outputs of various components of power conversion system 204 may be provided as inputs to power distribution board 202.

Power distribution board 202 may detect power system faults and distribute DC power signals to other components of the PCS. In some embodiments, power distribution board 202 uses the AC signals provided by power conversion system 204 to perform fault detection (e.g., ground fault detection, stray voltage detection, etc.). In some embodiments, power distribution board 202 uses the DC power supply signals provided by power conversion system 204 and/or battery 206 to produce DC power supply signals at various voltage levels (e.g., 5V, 12V, and 24V DC), and distributes those DC power supply signals to suitable components of the PCS 100.

In some embodiments, power distribution system DC power signals can be switched on and off. As those skilled in the art can appreciate, staggered activation of high-power devices (e.g., one or more components of display subsystem 170) reduces in-rush current demand on power supply 218. In some embodiments, the power distribution subsystem 110 is able to measure output current and can shut off power supply signals when the device reaches an over-current threshold. When a device causes over-current and "trips" the output, an error message may be sent to a maintenance center, indicating that the PCS requires servicing.

Battery 206 may provide backup power for components of PCS 100, including but not limited to user interface subsystem 150, which may implement emergency communication (e.g., E911) functionality. In some embodiments, power distribution board 202 may charge battery 206 (e.g., at 24 VDC) when power conversion system 204 is producing DC power and PCS 100 is not using all the available DC power. In some embodiments, a solar charging system may charge battery 206 during power outages or at other times.

In some embodiments, the power distribution subsystem 110 can detect whether the ground-fault circuit interrupter 224 has tripped. The ability to detect activation of the ground-fault circuit interrupter 224 can facilitate maintenance of the PCS. For example, while on back-up battery power, the PDS may determine whether AC power is lost (e.g., by sensing whether AC power supply signals are present) or the ground-fault circuit interrupter 224 has tripped. A suitable message can then be sent to the maintenance center, indicating, for example, whether the PCS requires service.

Returning to FIG. 1, network subsystem 120 controls communication on a network 124 within PCS 100, and communication between internal network 124 and a network 126 external to the PCS. In some embodiments, network subsystem 120 uses network 124 to communicate with power distribution system 110, maintenance subsystem 130, user interface subsystem 150, temperature control subsystem 160, display subsystem 170, and/or communications subsystem 180. The nodes of network 124 may be arranged in one or more suitable network topologies, including, without limitation, a bus (e.g., with network subsystem 120 as the bus controller), star network (e.g., with network subsystem 120 as the central hub), ring network, mesh network, tree network, point-to-point network, etc. Network 124 may be implemented using one or more suitable communication technologies, including, without limitation, Ethernet, DVI (Digital Visual Interface), HDMI (High-Definition Multimedia Interface), USB (Universal Serial Bus), SMB (System Management Bus), I2C (Inter-Integrated Circuit) bus, VGA (Video Graphics Array), SCSI (Small Computer System Interface), SPI (Serial Peripheral Interface) bus, LVDS (low-voltage differential signaling), etc.

Network subsystem 120 may send and receive any suitable data. For example, network subsystem 120 may control the operation of other components of PCS 100 by sending control data to the PCS's subsystems. Network subsystem 120 may forward commands received from a suitable source, including, without limitation, other PCS subsystems and/or network 126. As another example, network subsystem 120 may send operand data to components of PCS 100 for processing by those components (e.g., data to be displayed by display subsystem 170 or user interface subsystem 150, data to be transmitted by communications subsystem 180, etc.).

In some embodiments, network subsystem 120 communicates with network 126 via data link 122. Data link 122 may be implemented using a suitable communications line, including, without limitation, an Ethernet cable, coaxial cable, or optical fiber. In some embodiments, network subsystem 120 may include a signal conversion device adapted to convert the signals received on data link 122 from one form (e.g., optical signals) into another form (e.g., electrical signals).

Figure 3:
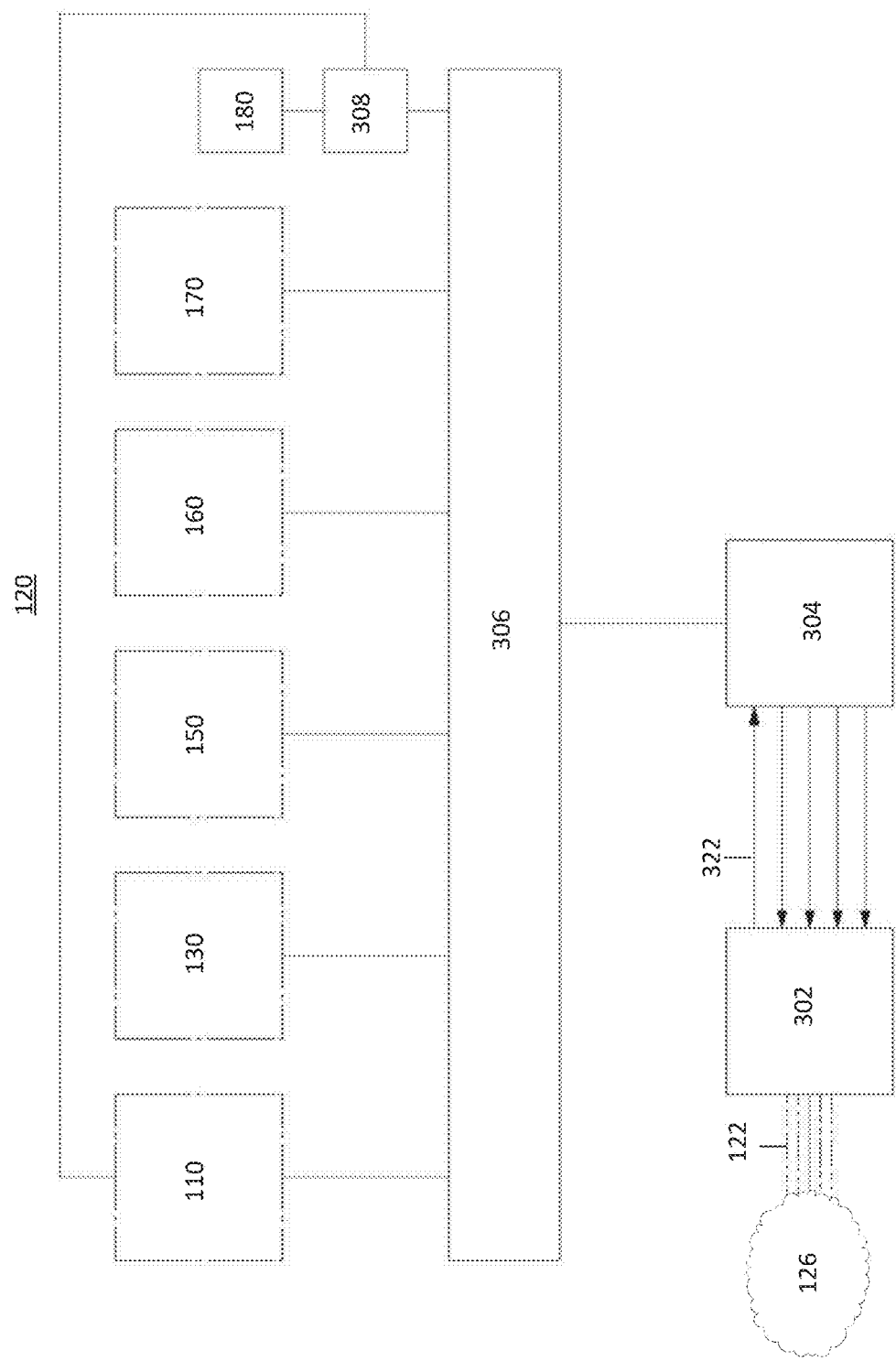
FIG. 3 is a schematic of a network subsystem of a PCS, in accordance with some embodiments.

FIG. 3 shows a schematic of a network subsystem 120, in accordance with some embodiments. In one embodiment, network subsystem 120 includes a fiber junction box 302, a service delivery switch 304, and a network switch 306. In the example of FIG. 3, data link 122 includes one or more optical fibers. Fiber junction box 302 may optically couple the optical fibers of data link 122 to one or more internal optical fibers 322. In some embodiments, fiber junction box 302 includes one or more quick disconnect devices, whereby the optical fibers of data link 122 may be protected from damage if PCS 100 is separated from its footing. Service delivery switch 304 may convert the optical signals received on optical fibers 322 into electrical signals representing network traffic (e.g., Ethernet packets), and provide that network traffic to network switch 306. Likewise, service delivery switch 304 may convert the network traffic (e.g., Ethernet packets) received from network switch 306 into optical signals, and provide those optical signals to fiber junction box 302. Network switch 306 may switch network traffic between PCS subsystems, or between a PCS subsystem and network 126. In some embodiments, network switch 306 is an Ethernet switch. Network switch 306 may be powered by power distribution subsystem 110.

In some embodiments, network subsystem 120 includes a power-over-Ethernet (POE) injector 308. The POE injector 308 may provide power to one or more PCS subsystems, including, without limitation, communications subsystem 180.

Returning to FIG. 1, maintenance subsystem 130 runs maintenance diagnostics on components of PCS 100. In some embodiments, maintenance subsystem 130 performs tests on the PCS's components and/or initiates self-tests of the PCS's components. Such tests may be performed periodically (e.g., daily, weekly, monthly, etc.), intermittently, randomly or at other suitable times. Alternatively or in addition, components of PCS 100 may perform such tests in response to commands received via network subsystem 120 (e.g., commands issued by a PCS operator via network 126 or via communications subsystem 180), or in response to other suitable events.

Based on the results of such tests, maintenance subsystem 130 may determine whether a tested component is operating properly. If a tested component is not operating properly, maintenance subsystem 130 may output data describing the component's malfunction (e.g., transmit an error code to a PCS operator via network 126 or communications subsystem 180, display an error message via display subsystem 170 or user interface subsystem 150, etc.), take action to resolve the malfunction (e.g., reboot the malfunctioning component), turn off power to the faulty component or to the entire PCS (e.g., if the malfunction presents a safety hazard), etc.

In some embodiments, maintenance subsystem 130 may be adapted to control or adjust the operation of power distribution subsystem 110, for safety purposes or other suitable purposes. As described above, if a safety hazard is detected, maintenance subsystem 130 may control power distribution subsystem 110 to deactivate the PCS 100 or the unsafe component(s). Alternatively, maintenance subsystem 130 may control power distribution subsystem 110 to "power cycle" or "reboot" a malfunctioning component.

Figure 4:
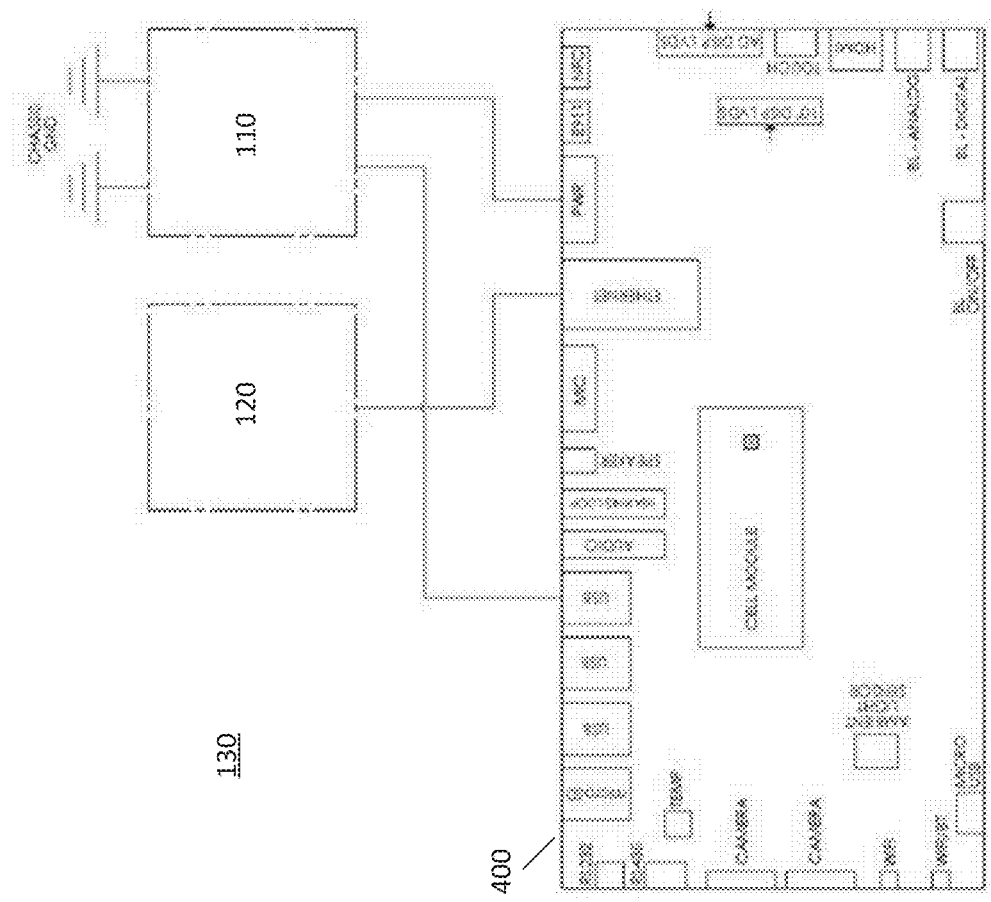
FIG. 4 is a schematic of a maintenance subsystem of a PCS, in accordance with some embodiments.

FIG. 4 shows a schematic of a maintenance subsystem 130, in accordance with some embodiments. In various embodiments, maintenance subsystem 130 includes one or more processing devices 400. The processing device(s) may include, without limitation, a microprocessor, microcontroller, small-board computer, system on a chip (SoC) (e.g., Qualcomm Snapdragon, Nvidia Tegra, Intel Atom, Samsung Exynos, Apple A7, Motorola X8, etc.), or other suitable processing device. The processing device(s) 400 may communicate with other components of PCS 100 via network subsystem 120 to perform maintenance tasks, or for other suitable purposes. In some embodiments, processing device(s) 400 are powered by power distribution subsystem 110.

Returning to FIG. 1, in addition to power distribution subsystem 110, network subsystem 120, and/or maintenance subsystem 130, electronics subsystem 140 may include other components. In some embodiments, electronics subsystem 140 includes one or more illumination controllers, which control illumination of one or more lights coupled to or proximate to the PCS. When lit, the lights controlled by the illumination controller may illuminate user interface subsystem 150 or other portions of PCS 100. In some embodiments, electronics subsystem 140 includes one or more sensor controllers, which control one or more sensor devices (e.g., microphones, cameras, ambient light sensors, pressure sensors, voltage sensors, environmental sensors, accelerometers, etc.). Such sensors may be used for any suitable purpose, including, without limitation, adjusting the brightness of displays and/or lights based on ambient lighting, surveilling the region proximate to the PCS (e.g., when an attempt to gain unauthorized access to the PCS is detected), etc.

Figure 5:
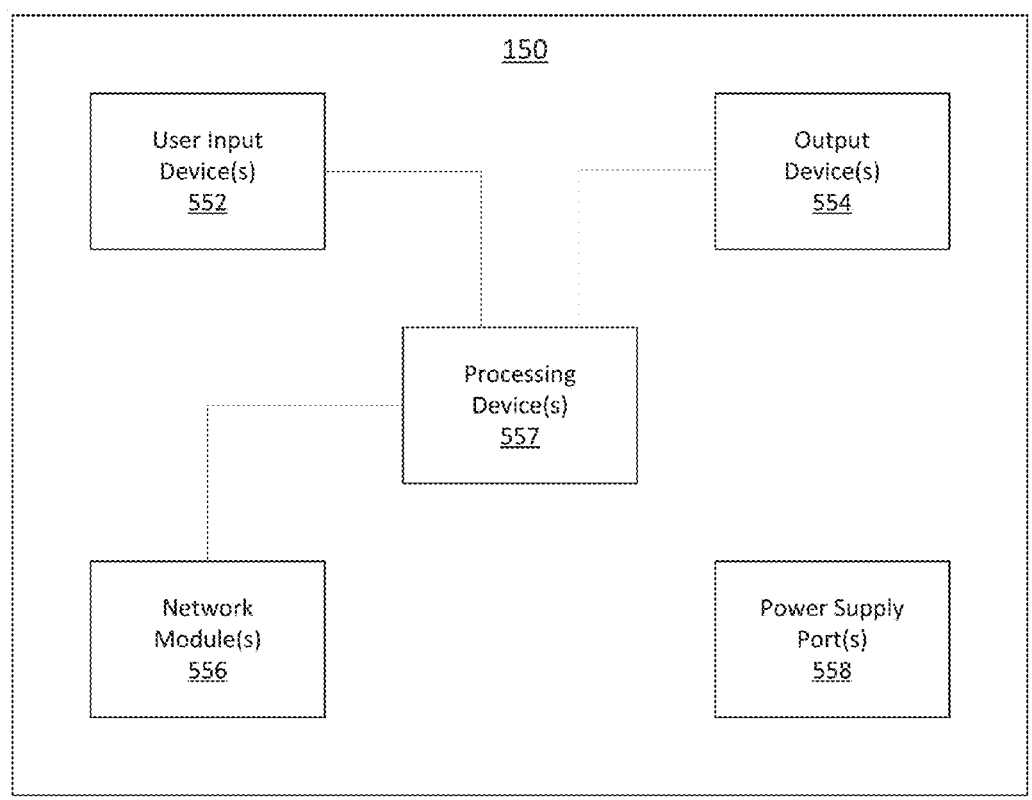
FIG. 5 is a block diagram of a user interface subsystem of a PCS, in accordance with some embodiments.

User interface subsystem 150 provides an interactive user interface, which may be used to access a communication network. Referring to FIG. 5, user interface subsystem 150 may include one or more user input devices 552, output devices 554, network modules 556 (e.g., network interface controllers, wireless transceivers, etc.), processing devices 557, and/or power supply ports 558. The user input device(s) 552 may include, without limitation, a touchscreen, touchpad, keyboard, keypad, trackball, one or more microphones, camera, buttons, switches, etc. The output device(s) 554 may include, without limitation, a display unit (e.g., touchscreen, LCD display, etc.), light(s), speaker(s), audio jack(s) (e.g., headset jacks, including microphone), etc. The one or more network modules 556 may include, without limitation, a 3G mobile network transceiver, 4G mobile network transceiver, LTE mobile network transceiver, Wi-Fi transceiver, RFID reader, Bluetooth transceiver, Near Field Communication (NFC) transceiver, Ethernet adapter, etc. In some embodiments, at least one of the network modules 556 may be configured to access network 126 via network subsystem 120 or to access a communication network via communications subsystem 180. The one or more processing devices may include, without limitation, a microprocessor, microcontroller, small board computer, or system on a chip (SoC) (e.g., Qualcomm Snapdragon, Nvidia Tegra, Intel Atom, Samsung Exynos, Apple A7, Motorola X8, etc.). The one or more power supply ports 558 may include, without limitation, one or more USB charging ports, a two-prong or three-prong AC power outlet (e.g., providing current limited AC power at 120 V, 60 Hz), etc.

User interface subsystem 150 may enhance users' access to communication networks in several ways. In some embodiments, user interface subsystem 150 may provide users access to communication networks (e.g., the Internet) via network module(s) 556. For example, a user may provide inputs via user input device(s) 552 to control a web browser or other network-based application executing on processing device(s) 557, which may access a communication network via network module(s) 556. The data obtained from the communication network may be processed by processing device(s) 557 and provided to the user via output device(s) 554. As another example, a user may connect a computing device (e.g., a mobile computing device) to user interface subsystem 150 via a network module 556 (e.g., a Wi-Fi access point), and access a communication network via another network module 556 (e.g., a mobile network transceiver), via communications subsystem 180, or via network 126. As yet another example, users may charge mobile computing devices via power supply port(s) 558, and access communication networks through the charged devices.

In some embodiments, PCS 100 includes an assisted listening unit that transmits the PCS's audio outputs to hearing assistance devices (e.g., hearing aids, Cochlear implants, etc.) within the assisted listening unit's range via a "hearing loop" (e.g., an "audio induction loop" or "audio-frequency induction loop"). The assisted listening unit may include a loop coil and a loop amplifier adapted to drive amplified signals into the loop coil, thereby creating a magnetic field that delivers the amplified signals to hearing assistance devices within the unit's range. The loop coil may be included in or located proximate to user interface subsystem 150, or disposed at another suitable location in, on, or near PCS 100.

In some embodiments, user interface subsystem 150 includes an interface for adjusting the assisted listening unit (e.g., for increasing or decreasing the signal strength or range of the assisted listening unit). The assisted listening unit's interface may include, without limitation, one or more buttons, dials, switches, and/or software-based interfaces. By adjusting the assisted listening unit, a user may control the range of the assisted listening unit and/or the volume of the audio output provided by the assisted listening unit.

In some embodiments, user interface subsystem 150 includes interface components for placing a phone call. User interface subsystem may implement the phone calls using voice-over-IP (VOIP) technology. The user's speech may be captured via the user interface subsystem's microphone, and the speech of other parties to the phone call may be provided via the user interface subsystem's speaker(s). In some embodiments, the user interface subsystem 150 permits users to place phone calls to emergency responders (e.g., E911 calls). The E911 calls may be placed using VOIP technology (e.g., via a network module 556 of user interface 150, via communications subsystem 180, or via network 126) or another suitable technology.

In some embodiments, the user input devices 552 include a microphone system, and the processing device 557 is able to perform noise cancellation on the microphone system. It can be appreciated that the PCS may be located in an environment with high levels of ambient street noise. The processing device 557 may perform a noise cancelling process that distinguishes the user's speech from the background noise and removes at least some of the background noise from the audio stream. When a user plugs in a headset that contains a microphone, the noise cancellation technique may also detect and remove background noise picked up by the headset's microphone.

Figure 6:
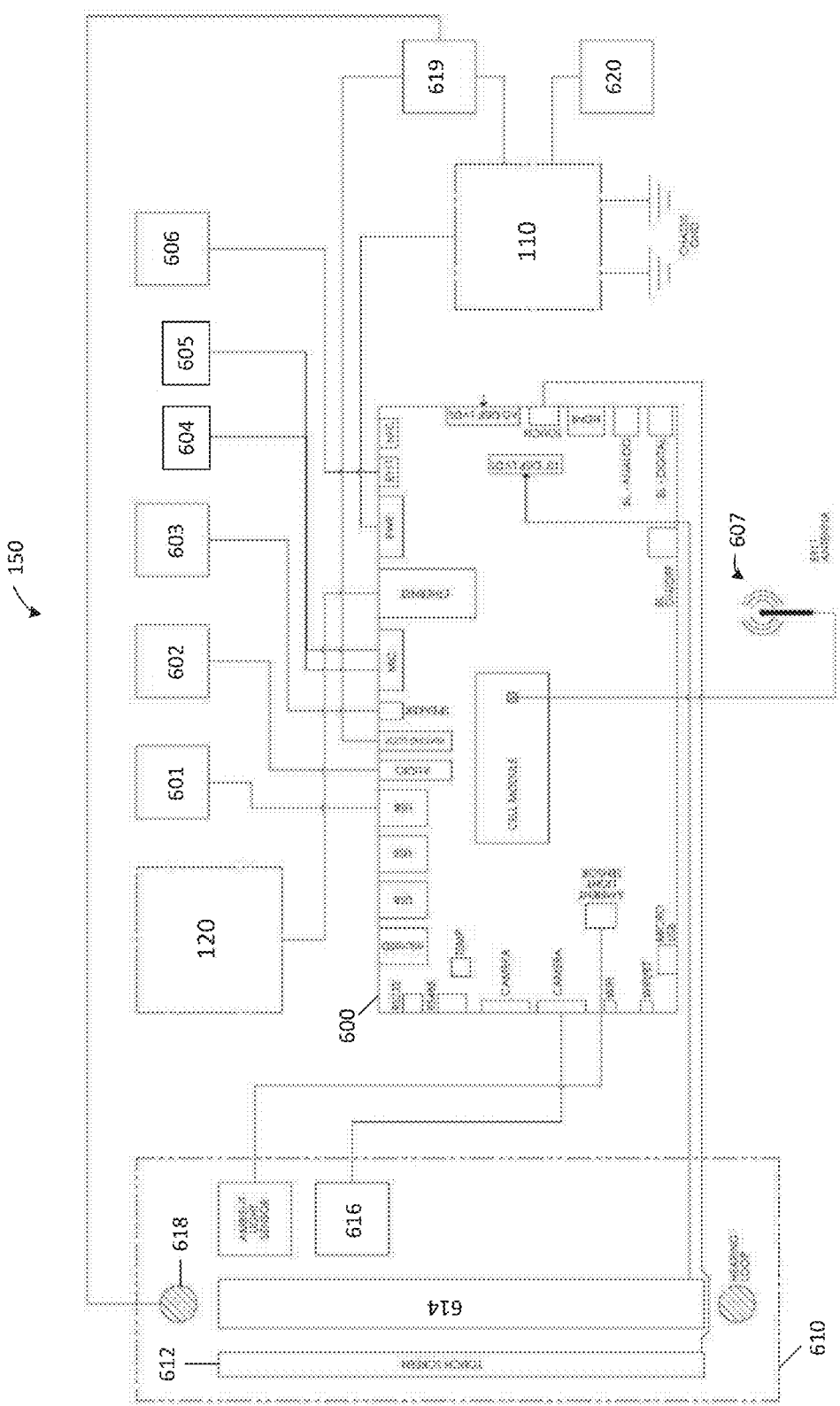
FIG. 6 is a schematic of a user interface subsystem of a PCS, in accordance with some embodiments.

FIG. 6 shows an exemplary schematic of the user interface subsystem 150, in accordance with some embodiments. In some embodiments, user interface subsystem 150 includes one or more processing devices 600. The processing device(s) 600 may include, without limitation, a microprocessor, microcontroller, small-board computer, system on a chip (SoC) (e.g., Qualcomm Snapdragon, Nvidia Tegra, Intel Atom, Samsung Exynos, Apple A7, Motorola X8, etc.), or other suitable processing device. The processing device(s) 600 may communicate with other components of PCS 100 via network subsystem 120. In some embodiments, processing device(s) 600 are powered by power distribution subsystem 110.

In the example of FIG. 6, user interface subsystem 150 includes a keypad 601, headset jack 602, speaker 603, two microphones (604, 605), and an E911 button 606, all of which are coupled to the processing device(s) 600. Processing device(s) 600 may be adapted to initiate an E911 communication when E911 button 606 is pressed, and to send and receive E911 messages via a wireless communication module 607 (e.g., a 3G, 4G, or LTE mobile network transceiver, including a suitable antenna, which may be located proximate to the top of the PCS).

In some embodiments, the E911 button contains an indicator. One example of the indicator is an illumination ring. The illumination ring may help a user to locate the button at night, and/or may flash when a user presses the button to indicate a E911 call is in progress.

In the example of FIG. 6, user interface subsystem 150 includes a touchscreen 612, display 614, camera 616, hearing loop coil 618, hearing loop amplifier 619, and USB charging port(s) 620. In some embodiments, the touchscreen 612, display 614, camera 616, and hearing loop coil 618 may be packaged together in a tablet computing device 610. The USB charging port(s) 620 and hearing loop amplifier 619 may be powered by power distribution subsystem 110.

Returning to FIG. 1, temperature control subsystem 160 controls the temperature within PCS 100. For example, temperature control subsystem 160 may cool the components of PCS 100. Some of the PCS's components generate heat and the PCS 100 may absorb heat from its environment (e.g., via radiation or convection), particularly when the ambient temperature is high or the PCS is exposed to direct sunlight. Extreme heat can interfere with the operation of the PCS or even permanently damage some of the PCS's components.

Alternatively or in addition, temperature control system 160 may, under appropriate conditions, heat the components of PCS 100. Some PCSs may be located in cold environments (e.g., outdoors in regions with cold ambient temperatures). Like extreme heat, extreme cold can interfere with the PCS's operation or damage its components.

Temperature control subsystem 160 may include one or more components suitable for heating and/or cooling the PCS. In some embodiments, temperature control subsystem 160 includes one or more fans operable to circulate ambient air through the PCS, which can cool the PCS. In some embodiments, the PCS 100 includes one or more heat sinks, and the ambient air circulated by temperature control subsystem 160 passes proximate to the heat sink(s). In some embodiments, temperature control subsystem 160 includes one or more fans operable to recirculate air in portions (e.g., airtight compartments) of PCS 100, which can facilitate the transfer of heat from those portions of the PCS to other regions of the PCS and/or to the ambient environment. The fans may be single-speed fans or variable-speed fans. In some embodiments, temperature control subsystem 160 includes one or more heaters, which can heat the PCS. In some embodiments, one or more fans and/or heaters are located apart from temperature control subsystem 160, but controlled by the temperature control subsystem.

Temperature control subsystem 160 may control the PCS's temperature by controlling the operation of the fan(s) and/or heater(s). In some embodiments, temperature control subsystem 160 controls the PCS's temperature based, at least in part, on the temperature inside or in an area proximate to the PCS. Temperature control subsystem 160 may obtain temperature information regarding the temperature in or near PCS 100 from one or more temperature sensors. The temperature sensors may be located inside the PCS, on an outer surface of the PCS, proximate to the PCS, and/or in any other suitable location. Temperature control subsystem 160 may include one or more sensor drivers that can activate the sensor(s) and obtain temperature measurements from the sensor(s). Alternatively or in addition, temperature control subsystem may obtain temperature information regarding the temperature in the vicinity of the PCS from a suitable source (e.g., a website) via a communication network (e.g., network 126).

In some embodiments, the temperature control system 160 adds or removes active fans (e.g., switches fans on or off) in specific areas of the PCS based on the temperature sensor information. For example, active fans may be added when the ambient temperature is high (e.g., above a threshold). Conversely, active fans may be removed when the ambient temperature is low (e.g., below a threshold) to reduce power usage. The fans may be organized in addressable groups to facilitate addition and removal of active fans.

In some embodiments, the temperature control subsystem 160 uses a feedback-based control system (e.g., a feedback loop) to control the speeds of the fans. The fans may include tachometers, and the tachometer outputs may be fed back to the temperature control subsystem, which may use the tachometer outputs to determine the speeds of the fans. In addition to adding and removing active fans, the temperature control subsystem 160 may increase the speeds of the fans as the internal temperature increases or decrease the speeds of the fans as the temperature decreases.

In some embodiments, the temperature control subsystem 160 uses the fan tachometer output to determine whether a fan fault has occurred. For example, the temperature control subsystem 160 may detect a fan fault when the tachometer output indicates that there is little or no fan rotation (e.g., the rate of fan rotation is below a threshold). When a fan fault is detected, the PCS may notify the maintenance center of the fault, so the PCS can be serviced to replace or repair the faulty fan.

In some embodiments, temperature control subsystem 160 controls the PCS's temperature based on environmental information, which may include temperature information and/or other information associated with the PCS's environment. For example, environmental information may include sunlight information indicating whether the PCS is exposed to direct sunlight. Sunlight information may be obtained from a camera or other suitable optical sensor. Alternatively or in addition, environmental information may include humidity information indicating the humidity levels in the PCS's environment, time-of-day information indicating the current time at the PCS's location, weather information indicating the weather in the PCS's environment, etc.

Based on the environmental information, temperature control subsystem 160 may control the fan(s) and/or heater(s) to adjust the PCS's temperature. In some embodiments, temperature control subsystem 160 may activate one or more heaters when the PCS's temperature is below a lower threshold temperature, and/or activate one or more fans when the PCS's temperature is above an upper threshold temperature. In some embodiments, the number of heater units and/or fans activated by temperature control subsystem 160 is determined based on the environmental information. In some embodiments, the settings of the activated heaters and/or fans (e.g., the fan speeds, the heater temperatures, etc.) may be determined based on the environmental information. In some embodiments, if the temperature in the PCS is determined to be outside a safe operating range, temperature control subsystem may instruct power distribution subsystem 110 to deactivate the PCS or at least one component thereof.

Display subsystem 170 includes one or more display modules, each of which includes at least one display device. The display device may include, without limitation, a liquid crystal display (LCD), light-emitting diode (LED) display, organic light-emitting diode (OLED) display, cathode ray tube (CRT), electroluminescent display (ELD), electronic paper/electronic ink display (e.g., a bi-stable or multi-stable electrophoretic or electro-wetting display), plasma display, thin-film transistor (TFT) display, 3D display (e.g., volumetric display, holographic display, integral imaging display, compressive light field display, etc.), stereoscopic display, etc. In some embodiments, display subsystem 170 includes two display modules disposed on opposite sides of the PCS, such that the modules' display devices face in opposite directions.

A display device may display suitable information, including, without limitation, news information, weather information, emergency information (e.g., instructions for dealing with an emergency, evacuation routes, etc.), travel information (e.g., traffic conditions, road conditions, speed limits, alternative route information, public transit schedules, locations of and/or directions to public transportation facilities, etc.), tourism information (e.g., locations of and/or directions to popular tourist attractions), advertisements, etc. The displayed information may be displayed in one or more suitable formats, including, without limitation, text, still images, and/or video. Display subsystem 170 may include one or more processing devices adapted to control the display of information by the display device(s). For example, each display module may include a processing device adapted to control the display module's display device.

In some embodiments, display subsystem 170 includes one or more cameras. For example, each display module may include one or more cameras. Display subsystem 170 may use the cameras to determine the ambient light levels, and may adjust the brightness of the display device(s) accordingly. For example, if the ambient light level at the PCS is high (e.g., because the sun is shining on the PCS), display subsystem 170 may increase the brightness of the display(s) (e.g., by increasing the brightness of the display backlight(s)), so that the displayed information is readily viewable by onlookers or passers-by. On the other hand, if the ambient light level at the PCS is low, display subsystem 170 may decrease the brightness of the display(s), to reduce the display subsystem's power usage and/or heat generation. In some embodiments, the brightness levels of the PCS's displays may be controlled independently.

Alternatively or in addition, display subsystem 170 may use the cameras to obtain information about "potential viewers" (e.g., people viewing the PCS, viewing a display device of the PCS, using the PCS, and/or in the vicinity of the PCS). In some embodiments, display subsystem 170 may determine, based on images of the area proximate to the PCS (e.g., images acquired by the PCS's camera(s)), a potential viewer's apparent demographic information, including, without limitation, age, sex, race/ethnicity, etc. In some embodiments, display subsystem 170 may use facial-recognition techniques to determine a potential viewer's identity.

Display subsystem 170 may use information about the PCS's potential viewers to select the information to be displayed by the display device(s) (e.g., to select advertisements for display based on the identities or demographics of the potential viewers). Alternatively or in addition, display subsystem 170 may track the identities and/or demographics of the potential viewers who have been in the vicinity of the PCS when particular advertisements have been displayed. Tracking information about potential viewers of advertisements and/or controlling the display of advertisements based on information about the potential viewers may increase the value of the PCS's advertising impressions to potential advertisers.

Display subsystem 170 may obtain information about a potential viewer from the potential viewer, from analysis of images of the potential viewer, and/or from the potential viewer's computing device (e.g., smartphone). For example, a potential viewer who connects to a communication network through a PCS 100 (e.g., via user interface subsystem 150 or via the user's computing device) may provide authentication data (e.g., a username, password, and/or other credentials), and the PCS may use that authentication data to access the potential viewer's account information, which may identify the potential viewer and/or provide information about the potential viewer (e.g., the potential viewer's attributes and/or interests). The potential viewer may have provided such information when registering for access to the PCS (or set of PCSs), or the PCS may have inferred such information based on the potential viewer's activities on the communication network.

Even if potential viewers do not register for PCS access, information about a potential viewer's attributes and/or interests can still be inferred based on the potential viewer's activities, and this information can be tracked in connection with information identifying the potential viewer's computing device (e.g., a mobile device's phone number, mobile equipment identifier (MEID), or unique device identifier (UDID); a computing device's media access control (MAC) address; etc.). In some embodiments, a PCS 100 may identify a potential viewer or attributes thereof based on identifying information transmitted by the potential viewer's computing device when the computing device is within range of the PCS, even if the computing device is not connected to a network via the PCS 100.

Figure 7:
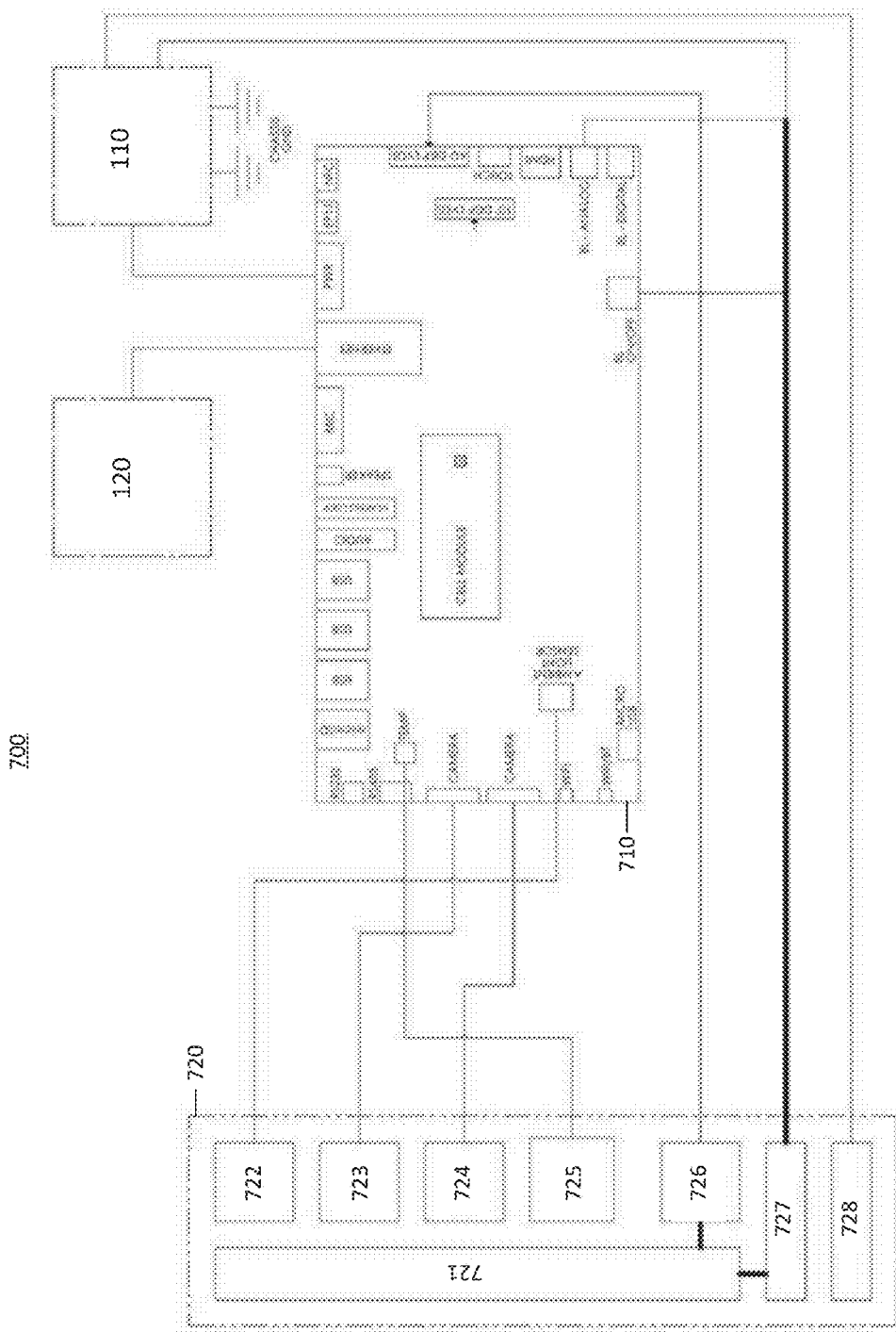
FIG. 7 is a schematic of a display module of a PCS, in accordance with some embodiments.

FIG. 7 is a schematic of a display module 700, in accordance with some embodiments. In some embodiments, a PCS 100 includes two display modules 700. In some embodiments, a display module 700 includes one or more processing device(s) 710. Each processing device 710 may include, without limitation, a microprocessor, microcontroller, small-board computer, system on a chip (SoC) (e.g., Qualcomm Snapdragon, Nvidia Tegra, Intel Atom, Samsung Exynos, Apple A7, Motorola X8, etc.), or other suitable processing device. The processing device(s) 710 may communicate with other components of PCS 100 via network subsystem 120. In some embodiments, each processing device 710 is powered by power distribution subsystem 110. In the example of FIG. 7, display module 700 also includes a display device 720. Display device 720 may include a display panel 721, ambient light sensor 722, two cameras (723, 724), temperature sensor 725, frame rate controller 726, power/backlight controller 727, and one or more fans 728.

In some embodiments, the processing device 710 is able to read the ambient light sensor 722 and send a control signal to the power/backlight controller 727. One example of the control signal is a pulse width modulated (PWM) output. In response to the ambient light sensor 722 detecting the presence of high ambient light, the duty cycle of the PWM signal may be increased, thereby causing the power/backlight controller to increase the backlight brightness, so that the display image is viewable in bright sunlight. Those skilled in the art can appreciate that the PWM control signal may be digital or converted to an analog output via a digital to analog converter.

Returning to FIG. 1, communications subsystem 180 includes one or more communication modules. In some embodiments, the communication module(s) include one or more radio access nodes. The radio access node(s) may include small cells (e.g., low-power radio access nodes with ranges between roughly 10 m and 1-2 km, including, but not limited to, femtocells, picocells, and microcells), macrocells (e.g., radio access nodes with ranges of up to a few tens of kilometers), etc. The radio access node(s) may reduce congestion in mobile data networks (e.g., 3G, 4G, or LTE networks) by expanding network capacity and offloading traffic from more congested portions of the network to the portions of the network associated with the radio access node(s). In areas where mobile data networks are highly congested (e.g., portions of New York City, and particularly portions of Manhattan), deploying PCSs with radio access node(s) in an area where mobile data networks are congested may, in some embodiments, greatly reduce network congestion and improve quality of service for many network users.

In some embodiments, communications subsystem 180 includes at least one wireless access point. Computing devices may connect to the wireless access point using a suitable wireless adapter, including, without limitation, a Wi-Fi or WiMAX adapter. Through the wireless access point, communications subsystem 180 may provide access to a local area network (LAN) or wide area network (WAN) (e.g., network 126, or a 3G, 4G, or LTE network accessed via the communications subsystem's radio access node(s)). PCS operators may use the wireless access points to provide wireless broadband network access to individuals, subscribers, communities, etc. Use of the wireless access points may further improve the quality of service on mobile data networks by offloading some users from the mobile data networks to the wireless access point.

Returning to FIG. 1, mounting subsystem 190 includes a mounting device that releasably secures the PCS to a support (e.g., a footing). The mounting device may be adapted to break when a shear force above a predetermined value is applied to the mounting device, thereby allowing the PCS to move. Such releasable mounting can reduce the damage caused to people and property when an automobile collides with the PCS.

Figure 8:
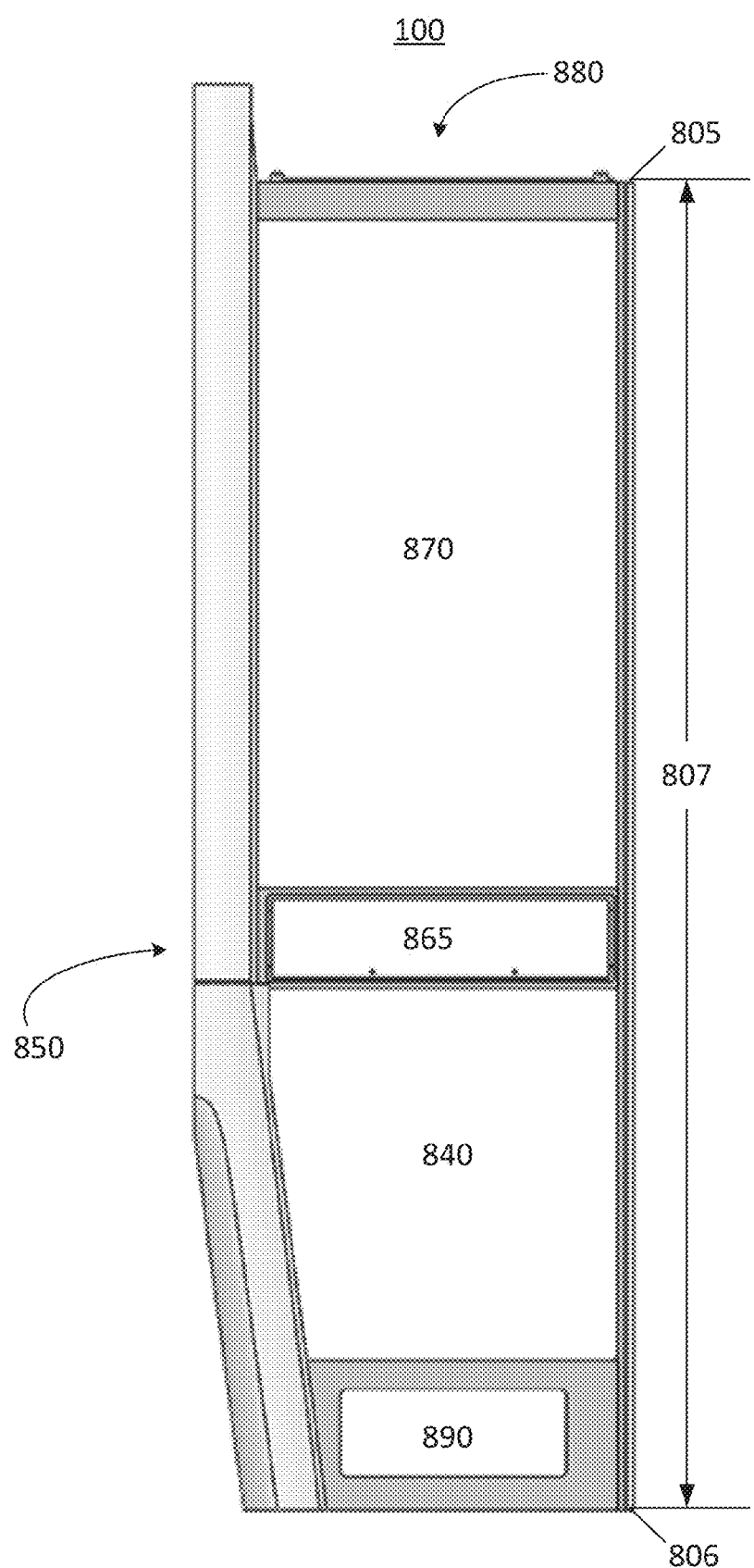
FIG. 8 illustrates an arrangement of compartments of a PCS, in accordance with some embodiments.

PCS 100 may include compartments and components of PCS 100 may be disposed in the compartments. FIG. 8 illustrates an arrangement of compartments of a PCS 100, according to some embodiments. For convenience, the PCS's top portion 805 and base portion 806 are identified in FIG. 8, as is the PCS's height 807.

In the example of FIG. 8, PCS 100 includes mounting compartment 890, electronics compartment 840, user interface compartment 850, air intake compartment 865, display compartment 870, and communications compartment 880. Electronics compartment 840 may enclose electronics subsystem 140. User interface compartment 850, display compartment 870, and communications compartment 880 may enclose user interface subsystem 150, display subsystem 170, and communications subsystem 180, respectively. In some embodiments, display compartment 870 may enclose, in addition to display subsystem 870, one or more heat sinks Mounting compartment 890 may enclose at least a portion of a mounting subsystem 190.

Air intake compartment 865 may enclose at least portions of temperature control subsystem 160. In some embodiments, air intake compartment 865 may enclose one or more fans, which may draw ambient air into the air intake area. In some embodiments, the one or more fans may also draw air into the air intake area from electronics compartment 840. The fans may move the air through display compartment 870 (e.g., across one or more heat sinks), and the air may be discharged through an exhaust in communications compartment 880. In some embodiments, air intake compartment 865 may enclose one or more heaters.

In the example of FIG. 8, communications compartment 880 is located proximate to the top 805 of the PCS, display compartment 870 is disposed along an upper portion of the PCS and below communications compartment 880, and an air intake compartment 865 is located proximate to a middle portion of the PCS (in the direction of the PCS's height) and below display compartment 870. Mounting compartment 890 is located proximate a base 806 of the PCS, electronics compartment 840 is disposed along a lower portion of the PCS between mounting compartment 890 and air intake compartment 865, and user interface compartment 850 is disposed along a lower portion of the PCS adjacent to air intake compartment 865 and electronics compartment 840.

Embodiments of a PCS are not limited by the compartmentalization scheme illustrated in FIG. 8. A PCS may include none of the compartments illustrated in FIG. 8, any combination of the compartments illustrated in FIG. 8, and/or other compartments not illustrated in FIG. 8. In cases where a PCS includes a compartment illustrated in FIG. 8 (e.g., mounting compartment 890, electronics compartment 840, user interface compartment 850, air intake compartment 865, display compartment 870, or communications compartment 880), the location and/or shape of that compartment may differ from the location and/or shape of the corresponding compartment in FIG. 8. In some embodiments, a PCS may include a compartment that encloses two or more PCS subsystems that are enclosed by different compartments in the example of FIG. 8. In some embodiments, a PCS may include separate compartments enclosing respective portions of a PCS subsystem that is enclosed by a single compartment in the example of FIG. 8. In some embodiments, a PCS may include a compartment that encloses other compartments.

Figure 9A:
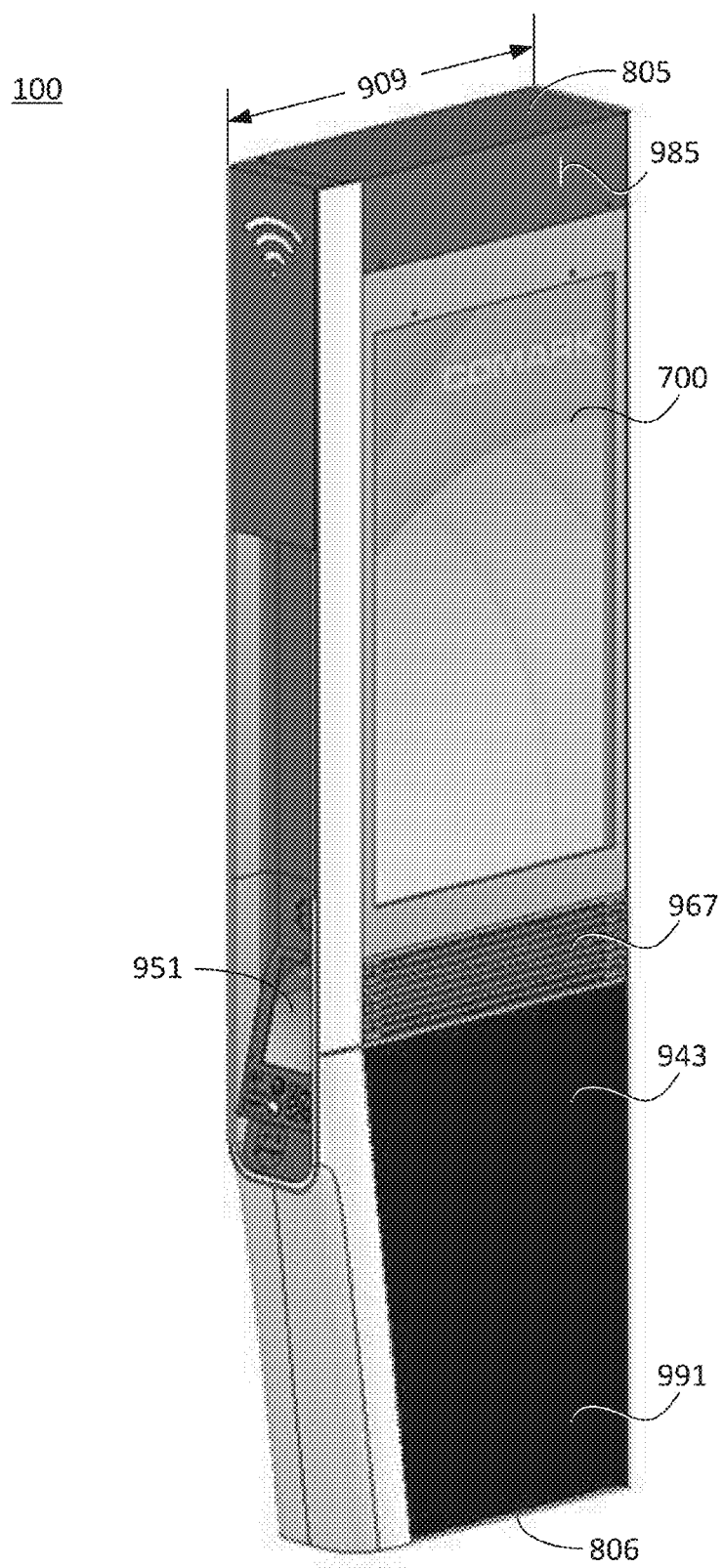
FIGS. 9A, 9B, and 9C show respective front perspective, side, and exploded front perspective views of a PCS, in accordance with some embodiments.
Figure 9B:
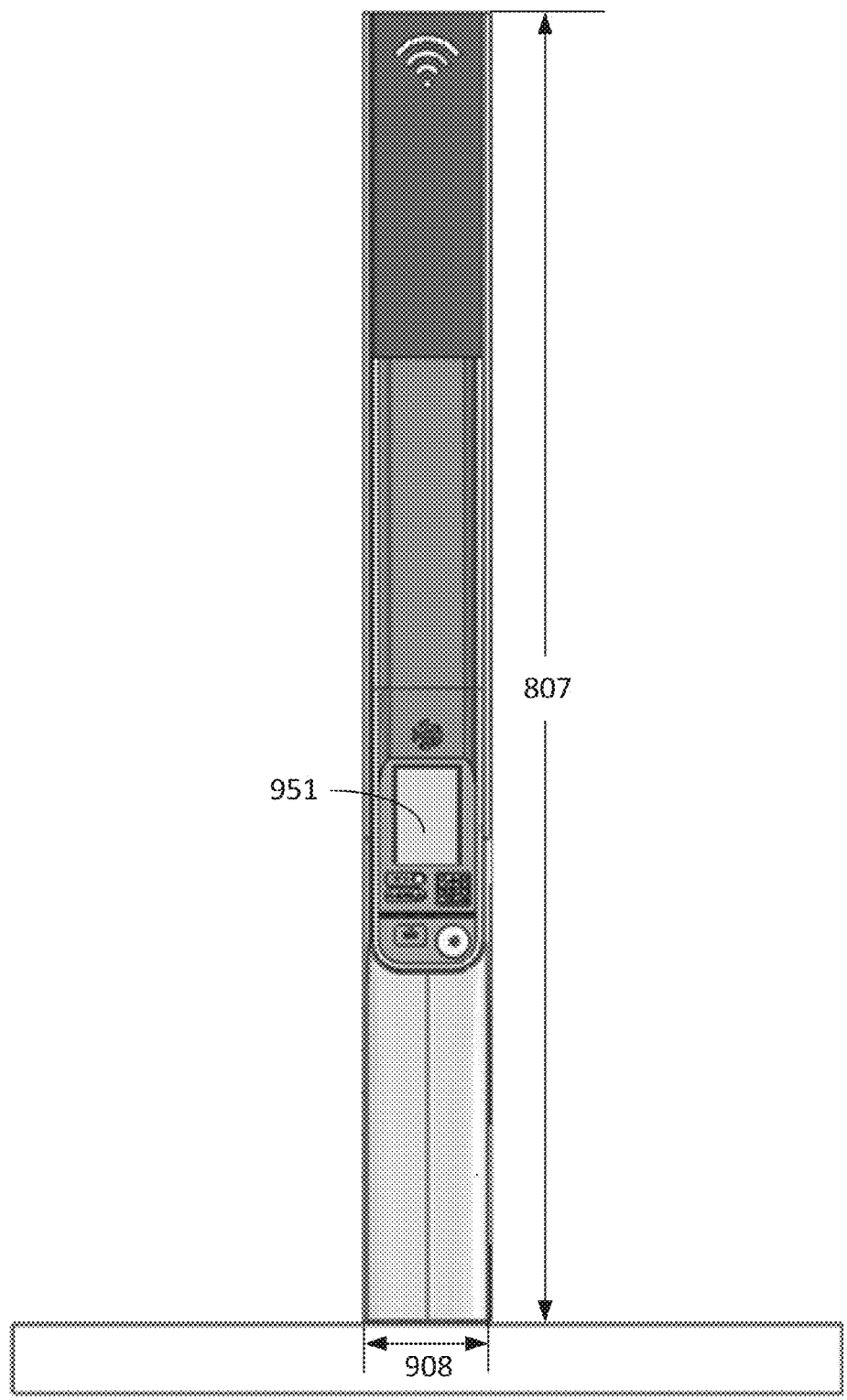
Figure 9C:
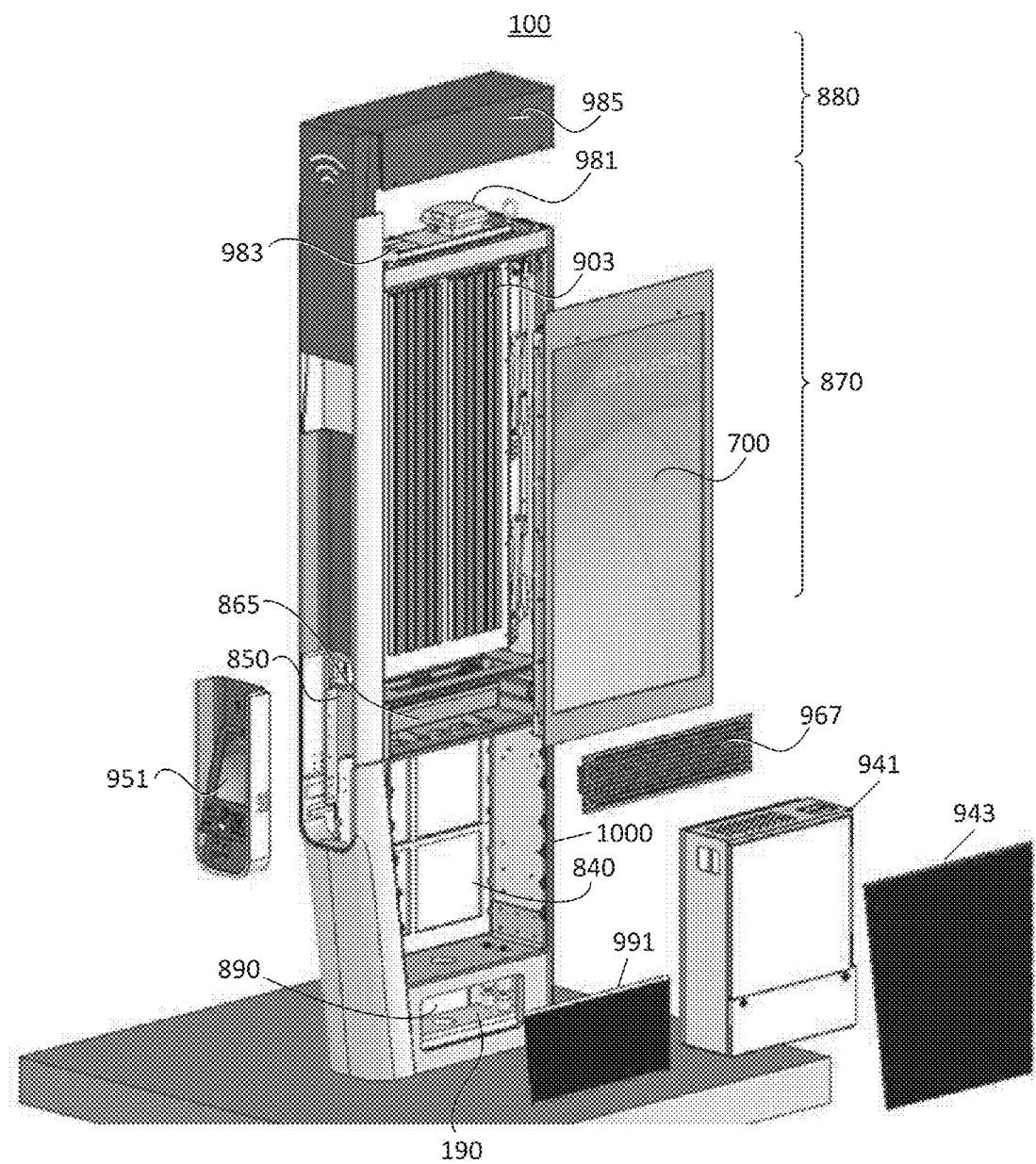

FIGS. 9A, 9B, and 9C show respective front perspective, side, and exploded front perspective views of a PCS 100, in accordance with some embodiments. For convenience, the PCS's top portion 805 and base portion 806 are identified in FIGS. 9A-9B, as are the PCS's height 807, width 908, and length 909.

As can be seen in FIG. 9C, PCS 100 may include a frame 1000. The frame 1000 is (or is part of) a structural system that supports the components of PCS 100. In some embodiments, the frame 1000 forms portions of the PCS's compartments (e.g., communications compartment 880, display compartment 870, air intake compartment 865, user interface compartment 850, electronics compartment 840, and mounting compartment 890).

As can further be seen in FIG. 9C, communications compartment 880 may include a radio access node 981, a wireless access point 983, and/or one or more antennas. The bottom of communications compartment 880 may be formed by a portion of frame 1000, and the top and sides of communications compartment 880 may be formed by a removable cap 985.

Display compartment 870 may include a heat sink 903 and a display module 700. In some embodiments, display compartment 870 includes a second display module (and, optionally, a second heat sink) arranged back-to-back (e.g., in parallel) with display module 700 and heat sink 903, such that display module 700 and the second display module face in opposite directions.

Air intake compartment 865 may include an air intake assembly 967. The air intake assembly 967 may include a grill, a filter, and a fan assembly. User interface compartment 850 may include a user interface device 951. The user interface device 951 may include a table computer, keypad, an emergency call button, microphone(s), speakers, and a mobile device charging port. Electronics compartment 840 may include an electronics cabinet 941, and may be formed by portions of frame 1000 and a cover panel 943. Mounting compartment 890 may at least partially enclose mounting subsystem 190, and may be formed by portions of frame 1000 and a cover panel 991.

Figure 10A:
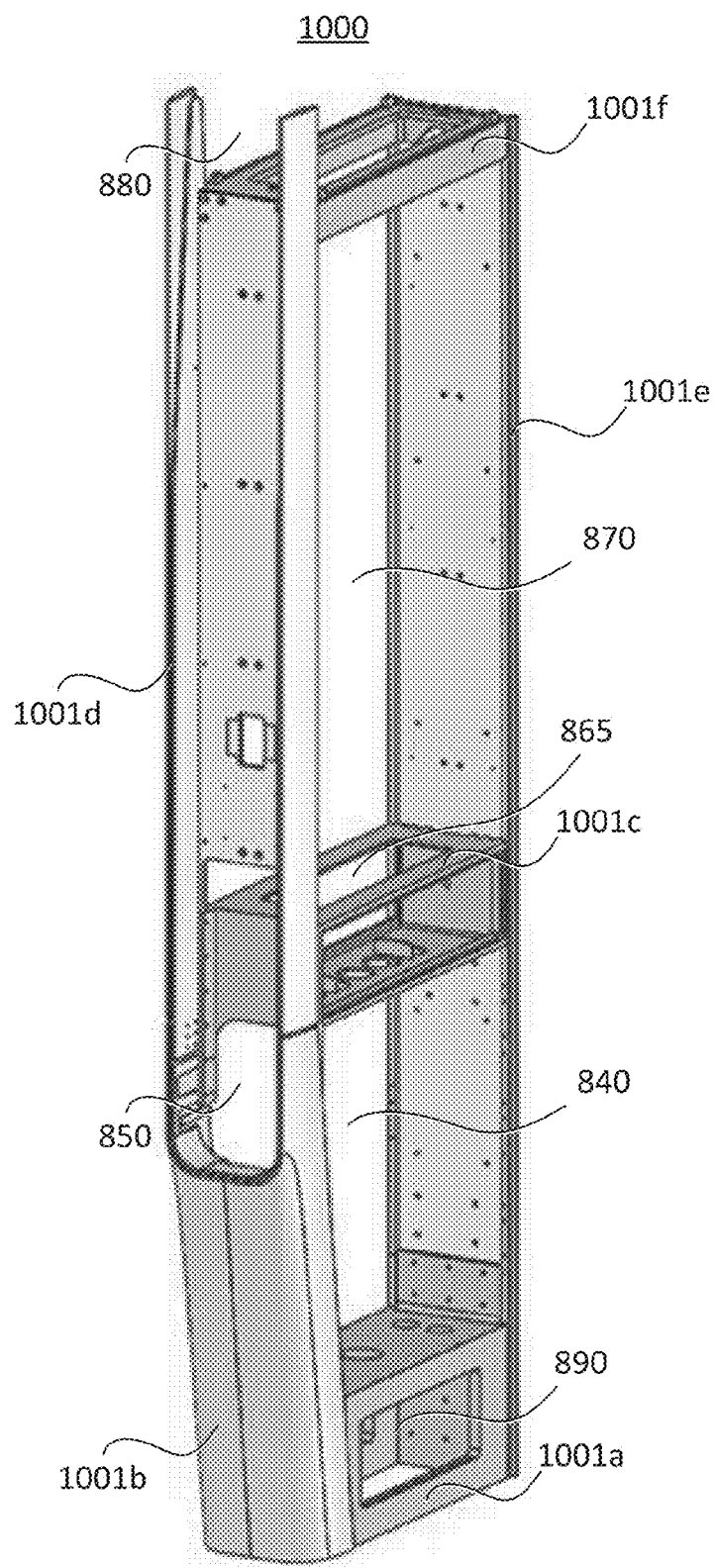
FIGS. 10A, 10B, and 10C show respective side perspective, front perspective, and exploded front perspective views of a frame of a PCS, in accordance with some embodiments.
Figure 10B:
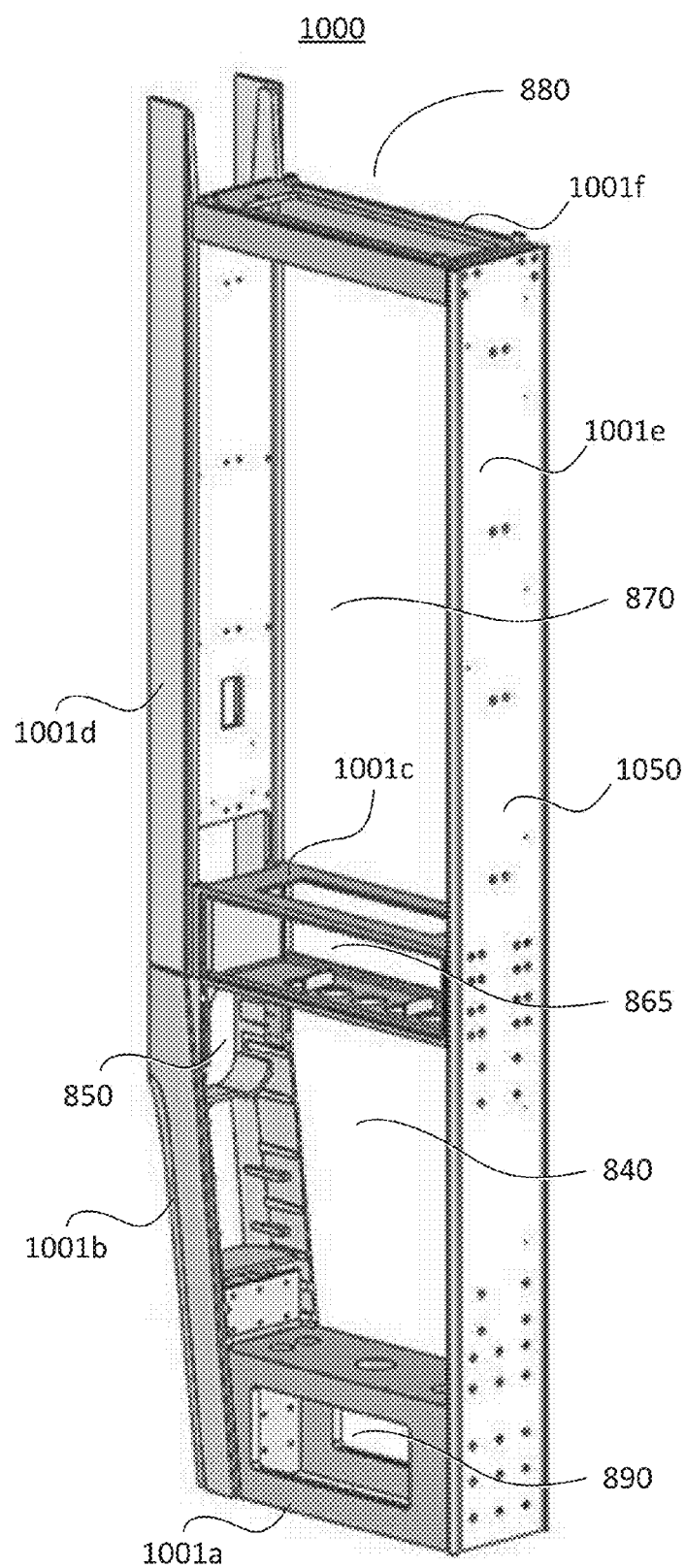
Figure 10C:
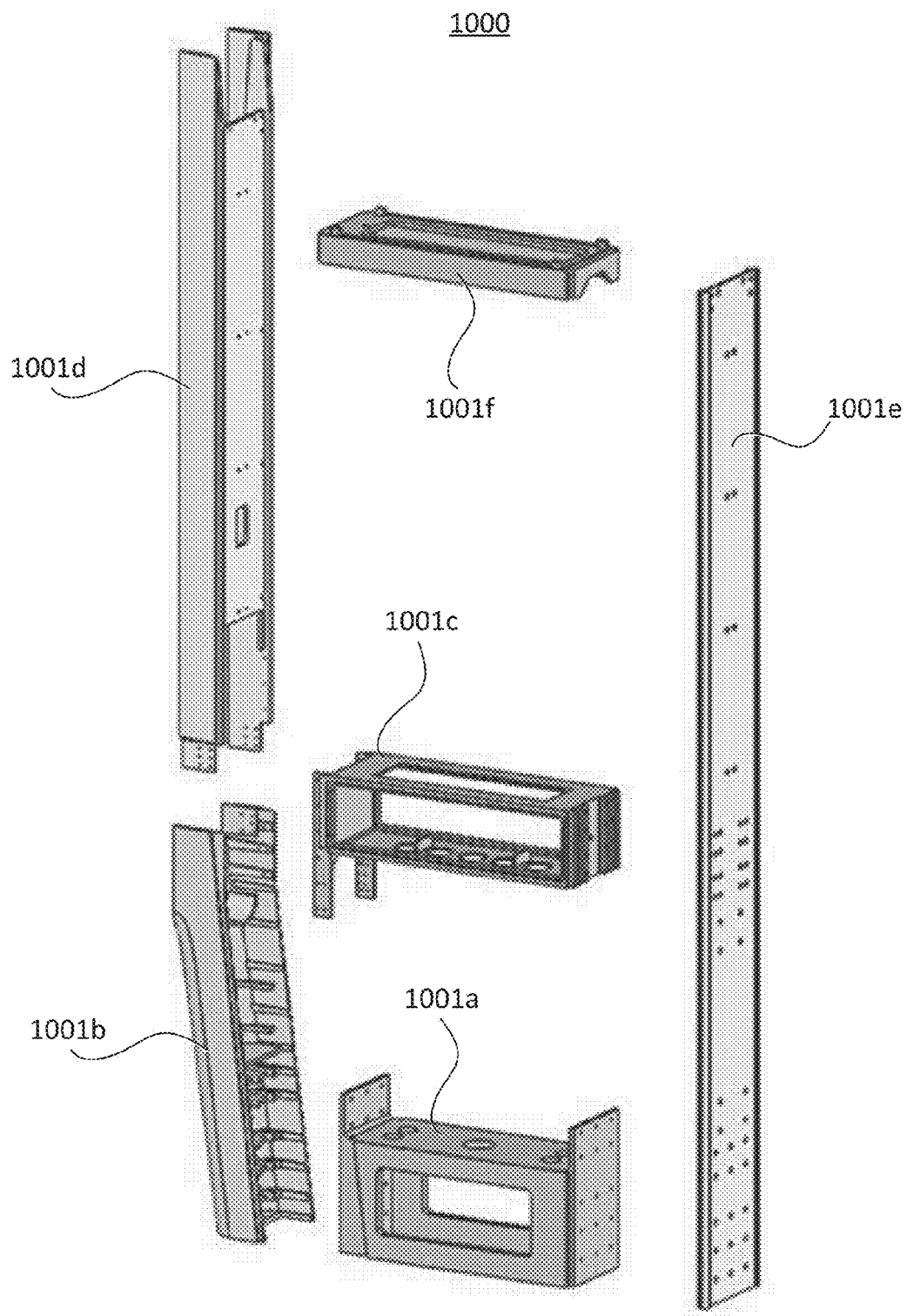

FIGS. 10A-10C show the frame 1000 of a PCS 100, according to some embodiments, and illustrate how the frame 1000 partially forms the PCS's compartments. In some embodiments, the frame 1000 is the frame of a monocoque structure, wherein the frame supports the components, forms the compartments and is also the outer face (or "skin") of portions of the PCS (e.g., the user interface compartment 850 and the opposing side 1050 of the PCS). This approach may simplify construction by reducing the number of brackets, mounting accessories, part count, etc.

In another embodiment, the frame 1000 is that of a traditional structure, and the outer skins are attached to the frame. In such embodiments, the frame supports the components of the PCS, forms the compartments of the PCS, and acts as a rigid structural chassis. One advantage of this approach is field replaceability. If an outer skin is damaged (e.g., by vandalism or by ordinary wear and tear), the damaged skin can be replaced with a new skin. As long as the frame remains uncompromised, damaged outer skins can be removed, replaced, and (optionally) sent to a service facility for refurbishing. Refurbishing methods may include removing dents and/or scratches, sanding, texturing, reshaping, and/or re-painting. Skins that are not suitable for refurbishing (e.g., due to extensive damage) may be recycled and turned into new parts.

As can be seen in FIGS. 10A-10C, frame 1000 may include a bottom member 1001*a*, a lower front member 1001*b*, a cross-frame member 1001*c*, an upper front member 1001*d*, a rear member 1001*e*, and a top member 1001*f*. In the example of FIGS. 10A-10C, lower portions of lower front member 1001*b* and rear member 1001*e* are joined to opposite sides of bottom member 1001*a*. One side of cross-frame member 1001*c* is joined to an upper portion of lower front member 1001*b* and a lower portion of upper front member 1001*d*. The opposite side of cross-frame member 1001*c* is joined to rear member 1001*e* proximate to a midpoint between the rear member's top and base ends. The upper portions of upper front member 1001*d* and rear member 1001*e* are joined to opposite sides of top member 1001*f*.

In the example of FIGS. 10A-10C, top member 1001*f* and the upper portion of upper front member 1001*d* form a bottom and a side of communications compartment 880. Two sides of display compartment 870 are formed by upper front member 1001*d* and rear member 1001*e*, and the top and bottom of display compartment 870 are formed by top member 1001*f* and cross-frame member 1001*c*, respectively. Cross-frame member 1001*c* forms the top, bottom, and two sides of air intake compartment 865. User interface compartment 850 is formed in part by the bottom portion of upper front member 1001*d*, the top portion of lower front member 1001*b*, and a side of cross-frame member 1001*c*. Two sides of electronics compartment 840 are formed by lower front member 1001*b* and the lower portion of rear member 1001*e*, and the top and bottom of electronics compartment 840 are formed by cross-frame member 1001*c* and bottom member 1001*a*, respectively. Bottom member 1001*a* forms mounting compartment 890.

Figure 11:
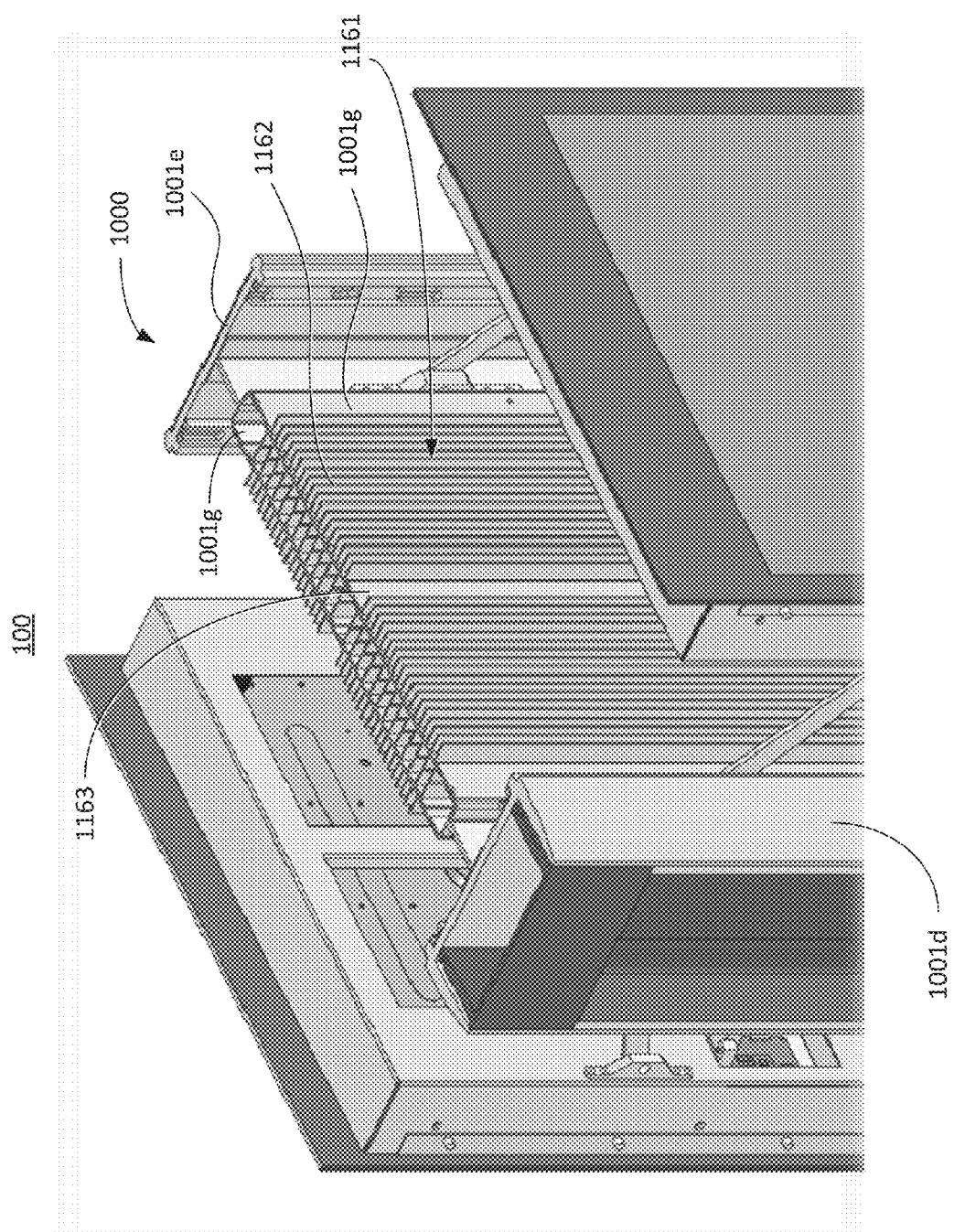
FIG. 11 shows a perspective view of a portion of a PCS, in accordance with some embodiments.

Embodiments of frame 1000 are not limited by the configuration shown in FIGS. 10A-10C. As can be seen in FIG. 11, which shows a front-perspective view of a portion of PCS 100, some embodiments of frame 1000 further include one or more cross-frame members 1001*g* coupled to upper front member 1001*d* and an upper portion of rear member 1001*e* to form an I-beam. In some embodiments, cross-frame member(s) 1001*g* may include one or more ribbed heat sinks 1161. A ribbed heat sink 1161 may include a substantially planar member 1163 and fins 1162 extending from the substantially planar member 1163 (e.g., in one or more directions substantially perpendicular to the surface of the substantially planar member).

Frame 1000 may facilitate cooling of the PCS's compartments. In some embodiments, one or more (e.g., all) members of frame 1000 may have relatively high thermal conductivity (e.g., average thermal conductivity of at least 90, 100, 110, or 120 Btu/(hr*° F.*ft)). When the temperature within a PCS compartment is greater than the ambient temperature in the area proximate to the PCS, the frame member(s) with relatively high thermal conductivity may function as heat sinks (including, but not limited to, cross-frame member(s) 1001g), such that heat from the compartments is transferred to the PCS's ambient environment through the frame member(s). The member(s) of frame 1000 with relatively high thermal conductivity may substantially consist of materials with relatively high thermal conductivity, including, without limitation, aluminum, thermal pyrolytic graphite, silicon carbide, etc. For example, one or more member(s) of frame 1000 may substantially consist of aluminum.

Members of frame 1000 may be manufactured using suitable techniques. In some embodiments, bottom member 1001a, lower front member 1001b, cross-frame member 1001c, cross-frame member(s) 1001g, and/or top member 1001f may be metal castings. In some embodiments, upper front member 1001d and/or rear member 1001e may be extruded metal, polymer, composite, etc.

Figure 12C:
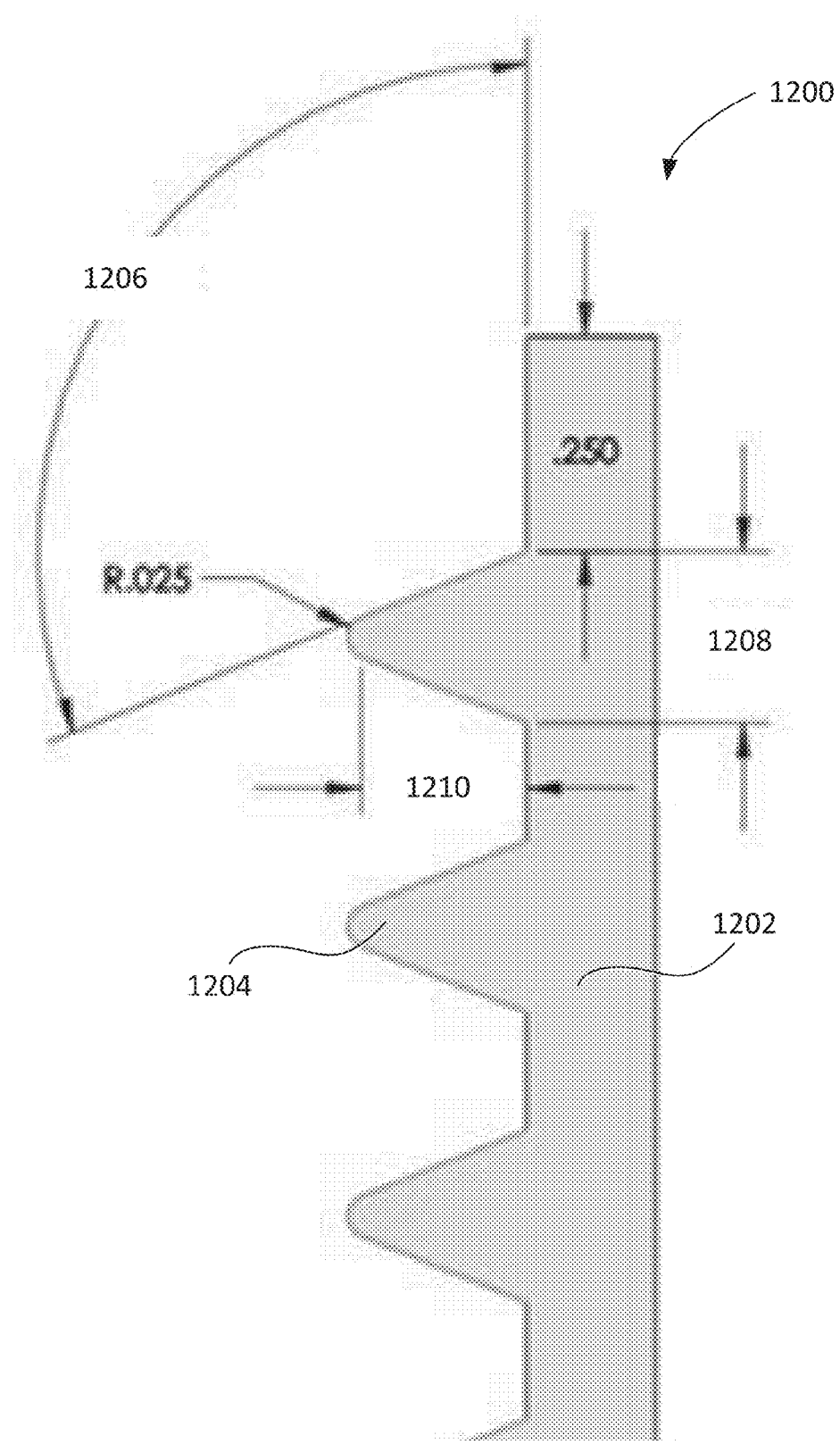
FIG. 12C shows a schematic side view of a ribbed panel, in accordance with some embodiments.

Referring to FIGS. 12A-12C, portions of a PCS's frame 1000 and/or compartments may be covered by ribbed panels 1200. The ribbed panels 1200 may discourage vandalism of PCS 100, since the panel ribs might offer a less appealing target for drawing, painting, or etching than other, smoother surfaces. In addition, the ribbed panels may be swappable, as shown in FIG. 12B, such that a damaged or vandalized panel could be quickly replaced with a pristine panel.

Referring to FIG. 12C, a ribbed panel 1200 may include a substantially planar member 1202 and a set of ribs 1204 extending from the planar member. In some embodiments, the angle 1206 between the outer surface of a rib and the outer surface of the planar member is between approximately 95° and 115°. In some embodiments, the thickness 1208 of a rib 1204 at the rib's base may be between approximately 0.25" and 0.5" and the width 1210 of a rib 1204 may be between approximately 0.3" and 0.6". Other dimensions may be used.

Placing Emergency Phone Calls Using a PCS

In certain embodiments, the term "E911" is used to describe any type of emergency call placed to public safety personnel, including a public safety answering point (PSAP). E911 may refer to, for example, 911, 311, 112, 108 or any other number that could be used to call public safety, around the globe.

Figure 13:
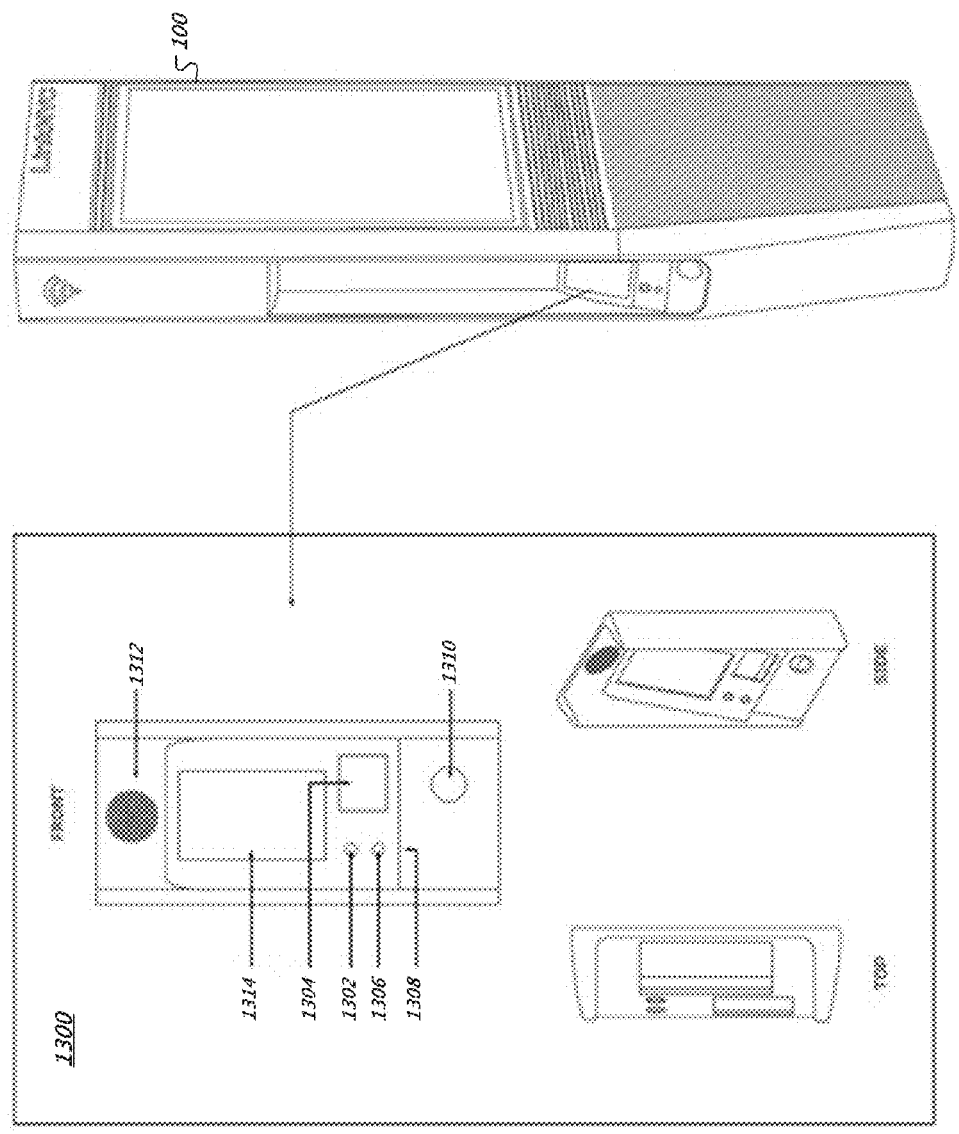
FIG. 13 is a schematic diagram of a user interface device on a PCS, in accordance with some embodiments.

Referring to FIG. 13, a user interface device 1300 of PCS 100 includes an emergency call button 1302 for placing an emergency call, a keypad 1304, a headphone jack 1306, a charging connector 1308, a Near Field Communication (NFC) transceiver 1310, a speaker 1312, and a display 1314 (e.g., a tablet computer). To initiate an emergency call using the PCS 100, a person on the street may simply press the emergency call button 1302 on the user interface device 1300. A brief press of the emergency call button 1302 may be sufficient to initiate the call. In certain applications, the person may be required to press and hold the emergency call button 1302 for a predetermined period of time (e.g., 1 or 2 seconds), before the emergency call is initiated. In some embodiments, a single press of the emergency call button 1302 causes a prompt to be presented on the display 1314. The prompt informs the user that the emergency call button 1302 must be pressed again to place the emergency call. Requiring the person to press and hold the emergency call button 1302 or to press the emergency call button 1302 twice may prevent inadvertent emergency calls due to, for example, a person accidentally bumping into or leaning on the emergency call button 1302. The emergency call button 1302 may be continuously illuminated to indicate its location and make it easier for the person to find the emergency call button 1302. When the emergency call button 1302 is pressed, the emergency call button 1302 may begin flashing, to provide an indication to the person that the call has been initiated. In preferred implementations, once the E911 call is placed, there is no way to hang-up or terminate the call from the PCS 100 (e.g., by pressing a hang-up button on the keypad 1304). Instead, the call preferably must be terminated by an operator who received the emergency call, for example, at a public safety answering point (PSAP). This prevents any unintended, premature termination of the emergency call and allows the operator to assess the circumstances that led to initiation of the call, before the call is terminated. To prevent an unintended termination of the emergency call, one or more buttons on the user interface device 1300 may be made inactive.

Figure 14:
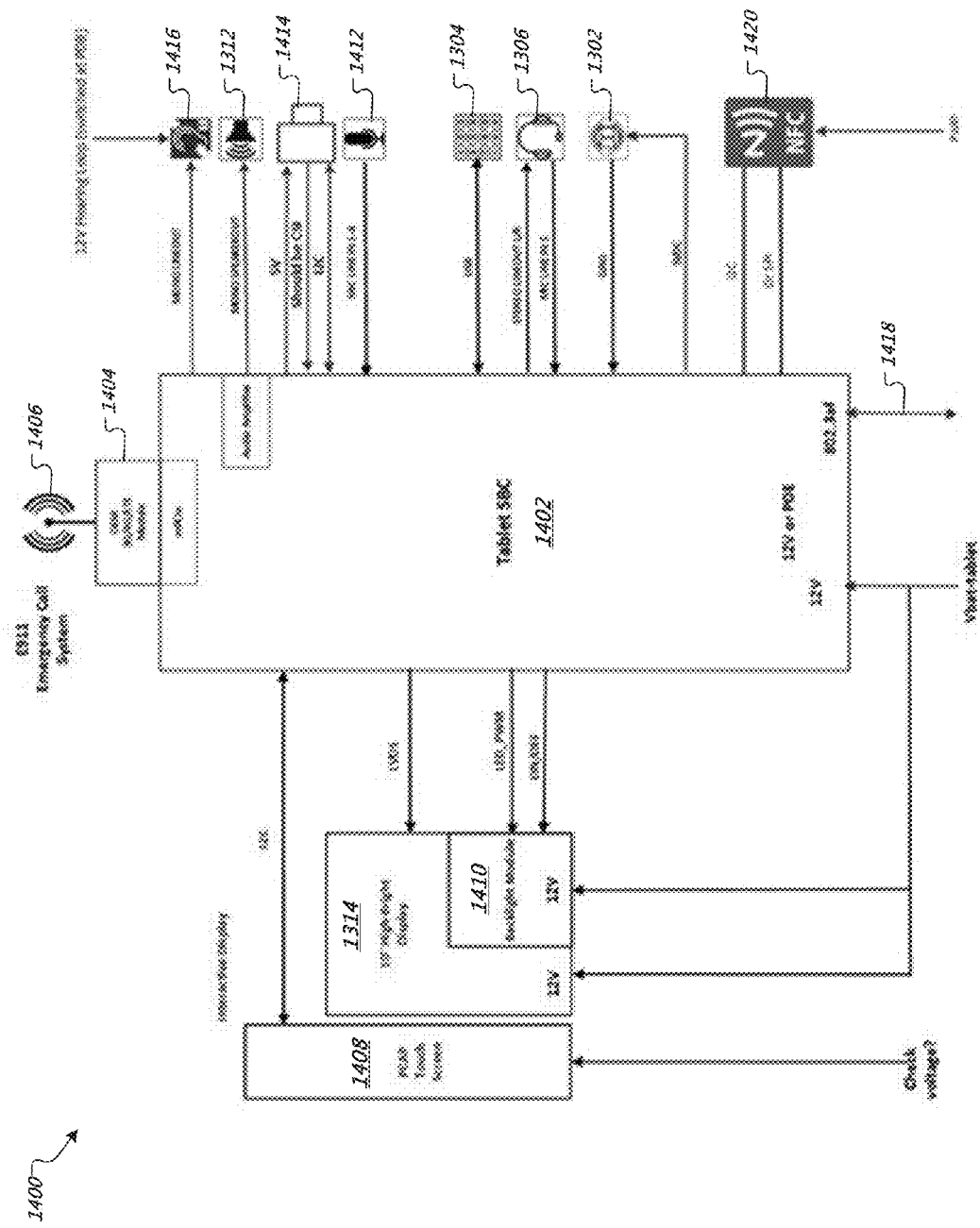
FIG. 14 is a schematic block diagram of an emergency call system on a PCS, in accordance with some embodiments.

FIG. 14 is an exemplary block diagram of an E911 system 1400 implemented using the PCS 100. The E911 system 1400 includes a single board computer (SBC) 1402 that acts as a primary controller. The emergency call button 1302 is connected to the SBC 1402, such that the SBC 1402 is able to detect when the emergency call button 1302 is pressed. In a preferred embodiment, the SBC 1402 is able to recognize when the emergency call button 1302 becomes stuck in a pressed position. In such an instance, the SBC 1402 can send a signal to an actuator or other mechanism to unstick the emergency call button 1302. In some embodiments, the SBC 1402 may send a message to a remote entity (e.g., a service center) indicating that the emergency call button 1302 needs maintenance or replacement.

In the depicted embodiment, the SBC 1402 includes a wireless phone module 1404, which may use or incorporate 3G, 4G, and/or LTE technology for placing the E911 call. The wireless phone module 1404 is connected to an antenna 1406 that is placed near a top surface of the PCS 100 structure. In a preferred embodiment, the wireless phone module 1404 is connected to the SBC 1402 via a PCI express connector. In another implementation, the wireless phone module 1404 is connected to the SBC 1402 via a USB interface. Those skilled in the art can appreciate that the wireless phone module 1404 could be connected to the SBC 1402 using other interfaces, as well.

In general, the SBC 1402 is able to communicate with the wireless phone module 1404, send commands to the wireless phone module 1404, and transmit and receive data. In some implementations, audio data (e.g., voice and sound) is transmitted and/or received between the SBC 1402 and the wireless phone module 1404. The SBC 1402 is preferably able to transmit data such as location information to the wireless phone module 1404. The tablet SBC 1402 is also connected to the keypad 1304, which is preferably accessible to disabled people and/or complies with the Americans with Disabilities Act. The keypad 1304 includes keys or icons for inputting numbers, adjusting volume, initiating a call, and terminating a call. Preferably, there is no key or button that allows a user to terminate an emergency E911 call. The keypad 1304 is preferably "tamper proof" and able to withstand wear and tear from fists or other objects.

The SBC 1402 is also connected to the display 1314, which is preferably an interactive "tablet" display that includes a touch screen 1408 and/or a backlight module

1410. When an emergency call is initiated, a "Calling E911" or similar message may be presented on the display 1314 to inform the user that the call is being made.

The SBC 1402 is also preferably connected to one or more microphones 1412 on the user interface device 1300. The SBC 1402 may use the microphones 1412 to run a noise canceling algorithm. The noise canceling algorithm is able to recognize the user's voice as a primary signal and cancel out any background noise. As can be appreciated, during a time of emergency, this feature may become critically important when the PCS 100 structure is mounted in a noisy location, such as a sidewalk near a busy street with sirens, car horns, etc.

The SBC 1402 also is also connected to the speaker 1312. An audio amplifier may be included to make the speaker 1312 audible over street noise and/or to people who are hard of hearing. In certain embodiments, when a user or person on the street presses the emergency call button 1302, a synthesized or recorded "Calling E911" audio message and/or tone indicator is played on the speaker 1312. The speaker 1312 may also transmit the emergency operator's voice to the user.

Alternatively or additionally, the SBC 1402 may be connected to the headphone jack 1306, which is designed to accommodate a user's headphones and/or microphone. The SBC 1402 may detect when the headphones are connected and turn off an audio stream to the speaker 1312. The noise cancelling system may use the user's microphone (e.g., on a headset) in addition to or instead of the built-in microphone 1412 on the user interface device 1300, to cancel background noise.

In some implementations, the SBC 1402 is connected to or includes one or more cameras 1414. The cameras 1414 may be used to take pictures and/or video, and the E911 system may transmit the pictures and/or video to the E911 operator during the emergency call. This allows the E911 operator to view an area around the PCS 100, which may help the operator better understand the emergency associated with the call. For example, the operator may be able to view an accident scene and/or a person or thing involved in the emergency.

In some embodiments, the E911 system 1400 is also able to receive images and/or video during the emergency call. For example, a user of the E911 system may be able to receive coaching or instructions from the E911 operator, in the form of images, video, audio, and/or text. In the case of a medical emergency, for example, the operator may send a video or images showing a user of the E911 system how to perform a life-saving procedure, such as Cardio Pulmonary Resuscitation (CPR), to assist the injured person. Instructional video can be shown on the display 1314, to enable the user and others to view and administer appropriate medical care.

The SBC 1402 may also accommodate or be connected to a hearing loop 1416. The hearing loop 1416 may utilize loop magnetics to stimulate a hearing aid of a person, so the person is able to hear the call. The SBC 1402 preferably includes an Ethernet connection 1418 to connect to the Internet, thereby allowing the SBC 1402 to place voice over internet protocol (VOIP) calls and transmit/receive data. A near field communication (NFC) module 1420 (e.g., a BLUETOOTH module) may be connected to the SBC 1402, to permit certain wireless connections with the PCS 100.

The E911 system 1400 preferably contains or uses at least one configurable parameter, such as a phone number, location information, a subscriber identifier number, an international mobile equipment identity number, carrier information, a call-back number, a call-back time period, or other types of numbers or information. When the E911 system is implemented in the PCS 100, a worker may configure one or more of these parameters.

Figure 15:
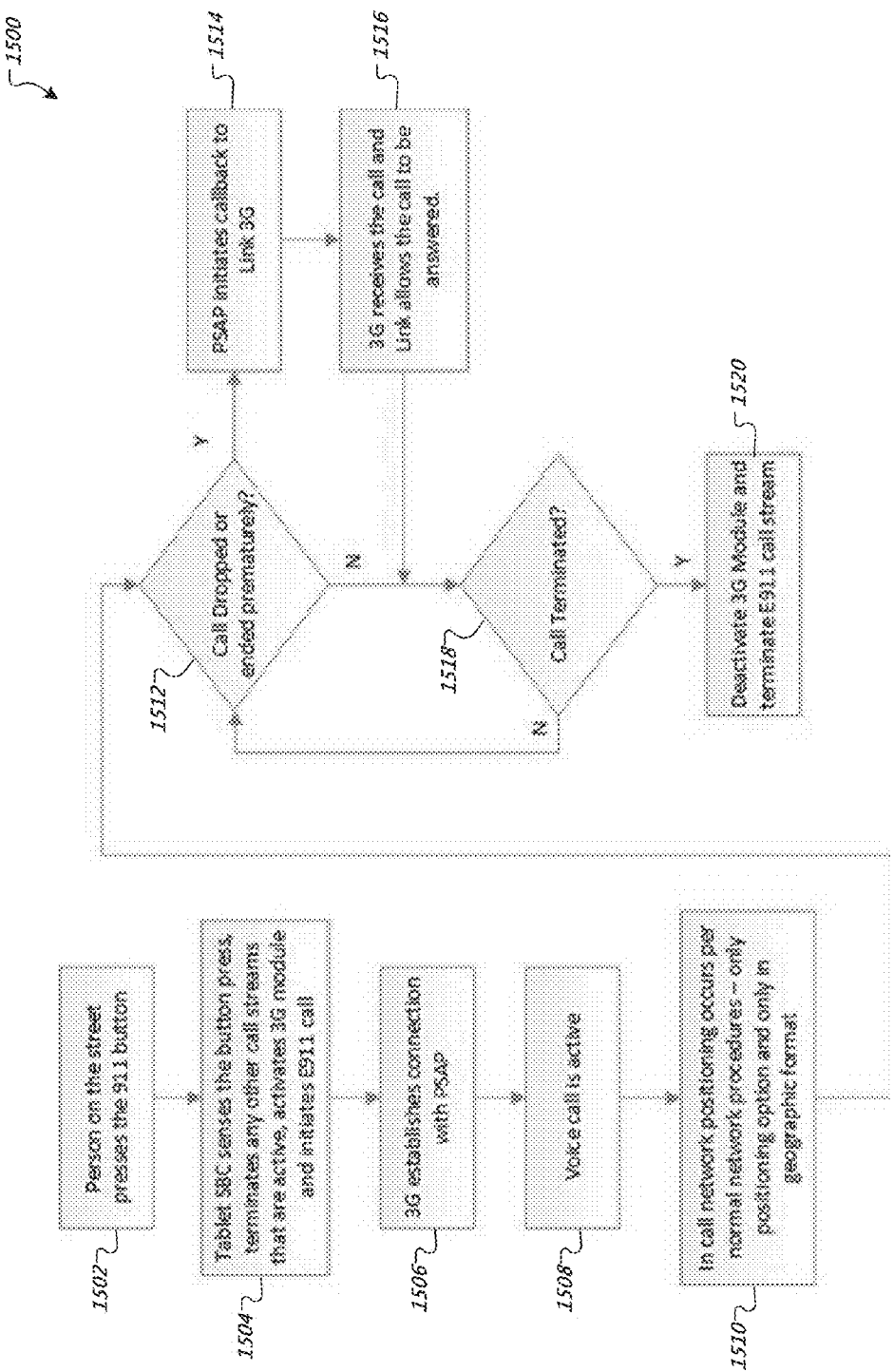
FIG. 15 is a flow chart of an example method of placing a 3G emergency call using a PCS, in accordance with some embodiments.

FIG. 15 is an example method 1500 used by the E911 system 1400 for placing an E911 3G call. When the emergency call button 1302 is pressed (step 1502), the SBC 1402 initiates a 3G emergency call and terminates any other active call stream (step 1504). This means if someone is using the user interface device 1300 or the SBC 1402 to make a voice or video call, that existing call may be terminated when the emergency call button 1302 is pressed, and the E911 call will be placed. Preferably, none of the other services provided by the PCS 100 will be interrupted. For example, access to small cells and Wi-Fi (including phone calls being made using those features) may continue when the E911 call is placed, so there is little or no impact to users of those system components. Placing the E911 call preferably does not affect the advertisements being shown on the PCS 100.

After the 3G connection is established (step 1506) with the emergency operator (e.g., at the public safety answering point) and the emergency call is active (step 1508), location information for the PCS 100 may be automatically transmitted for emergency dispatch (step 1510). For example, location information may be programmed into the PCS 100, and the PCS 100 may automatically convey the location information to the emergency operator or an associated PSAP. In some instances, an identification number associated with the PCS 100 is transmitted with the emergency call, and the PSAP is able to obtain location information for the PCS 100 by looking up the location information associated with the identification number. The location information may be obtained, for example, from a database used by the public safety answering point (PSAP). When the emergency call is active, the location information is preferably "looked up" so emergency dispatch can determine the location of the PCS 100. The location information may be or include, for example, a street address, a cross-street, a latitude and longitude, and/or a mile marker.

In various embodiments, the E911 system 1400 is provided with a phone number (e.g., a cell phone number or a conventional wire telephone number), so, if the original emergency call is dropped (step 1512), the operator can place a return call back to the PCS 100 (step 1514). Preferably, the original call and the return call may each be any type of phone call. For example, the original call may be a VOIP call, a wireline call, or a cellular call (e.g., using 3G, 4G, or LTE), while the return call may be a VOIP call, a wireline call, or a cellular call. The type of call may depend on the circumstances associated with the emergency. For example, if cellular towers are not operational, the PCS 100 or the operator may place calls using VOIP or wireline. In some implementations, the E911 system 1400 is given a configurable phone number that is recognized by the PSAP. The PSAP may look up location information associated with the phone number, to determine the location of the PCS 100. Alternatively or additionally, a mobile subscriber identifier number (MSIN) may be used to look up the location information. Other methods of obtaining the location information for the PCS 100 are contemplated.

In certain embodiments, the PCS 100 is capable of receiving calls only from a PSAP. Preferably, the PCS 100 is able to recognize a pre-programmed phone number associated with the PSAP, such that the PCS 100 allows a call from the PSAP to be received (step 1516). All other calls to the PCS 100 (e.g., from individuals dialing a wrong number) preferably are not able to be received at the PCS 100.

In some instances, the E911 system 1400 allows calls to be received at the PCS 100 only for a predetermined period of time after an E911 call has ended. For example, if the PCS 100 is unable to determine the phone number associated with a PSAP, the PCS 100 may be able to receive a call from any number after an E911 call, for the predetermined time period. This allows the PSAP operator to return a prematurely terminated emergency call, even when the PCS 100 does not recognize the number of the PSAP. In such an instance, the predetermined period of time (i.e., the call-back time period) may be, for example, about 30 seconds, about 1 minute, or about 2 minutes, given that the PSAP would be expected to return the call within a short period of time.

In certain implementations, the PCS 100 is not given a carrier phone number but is permitted to make emergency calls to a PSAP. For example, the law in many jurisdictions permits phones to place emergency calls, even if the phone does not have a carrier phone number. In this case, it may not be possible for a PSAP to place a return call when the emergency call is terminated. After receiving the original call, however, the PSAP should already have the necessary location information and other details necessary to dispatch emergency personnel to the PCS 100 location.

Referring again to FIG. 15, the emergency call ends when it is terminated by the PSAP (step 1518). When the call has ended, the 3G module (e.g., the wireless phone module 1404) is deactivated and the E911 call stream on the SBC 1402 is terminated (step 1520). To conserve power, the 3G module may be placed in sleep mode when the 3G module is no longer in use.

In some examples, an indicator is presented on the PCS 100 (e.g., on the display module 700) while an E911 call is in place. The indicator may be, for example, an E911 symbol, a flashing light, a red "emergency in process" banner, instructions for emergency dispatch, and/or emergency messages for the public. It can be appreciated that presenting an indicator or message such as "emergency in process" on the display module 700 may help first responders locate the scene.

The PSAP may be able to control the information (e.g., text, images, or video) presented on the display 1304 or played through the speaker 1312. This way, the PSAP can provide coaching, instructions, or other valuable information to users of the PCS 100 during an emergency.

Figure 16:
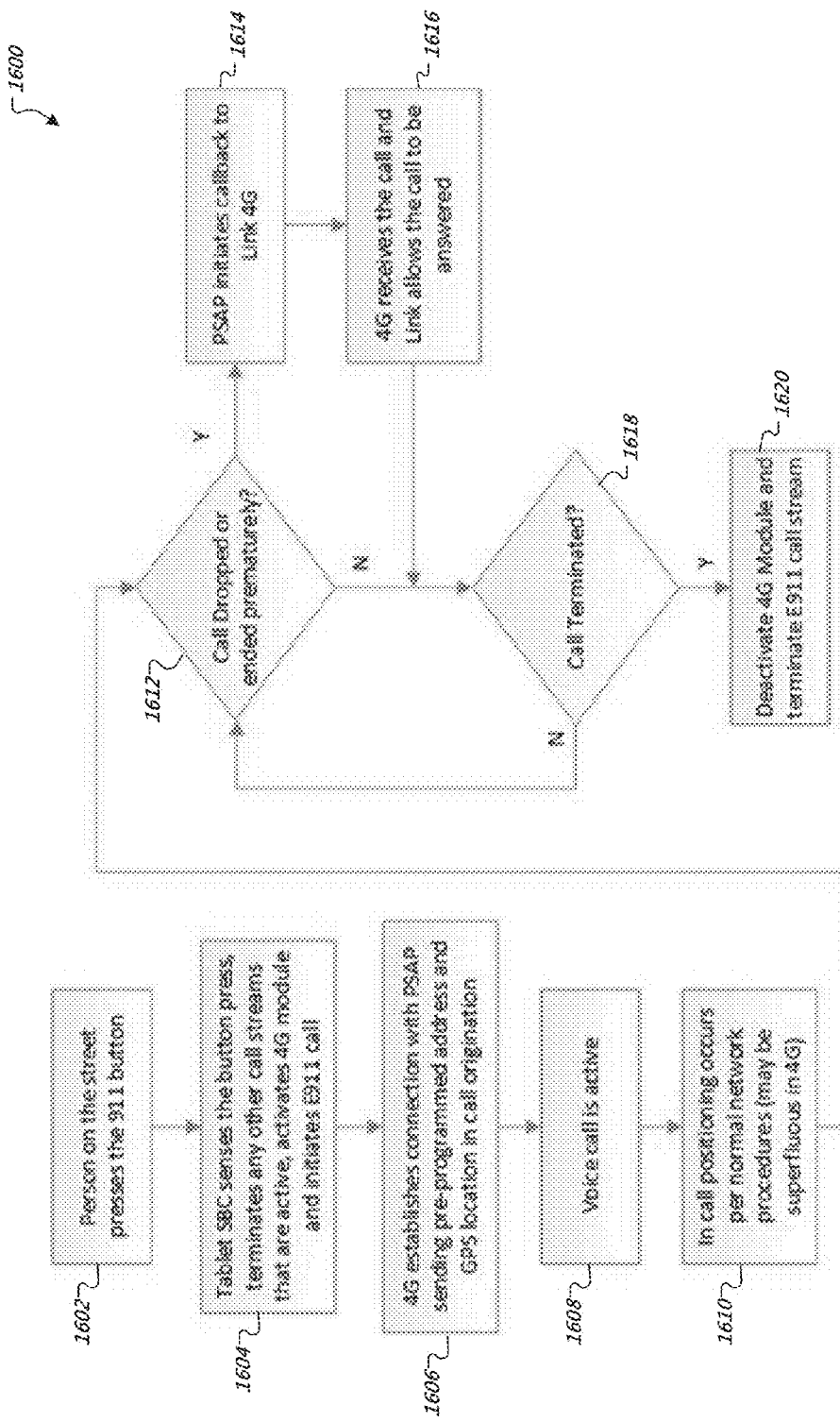
FIG. 16 is a flow chart of an example method of placing a 4G/LTE emergency call using a PCS, in accordance with some embodiments.

FIG. 16 is an example method 1600 used by the E911 system 1400 for placing an E911 4G call. In general, method 1600 is similar to method 1500 except that method 1600 may use voice over LTE (VOLTE). When a person presses the emergency call button 1302 (step 1602), the SBC 1402 terminates other active call streams, as discussed herein, activates the 4G module (e.g., the wireless phone module 1404) and initiates the E911 call (step 1604). A connection with the PSAP is established and address information and/or GPS location are provided (step 1606). During the call (step 1608), in call positioning may occur per normal network procedures (1610) (e.g., through the use of cell tower triangulation and/or by passing address or location information). If the call is dropped prematurely (step 1612), the PSAP may initiate a return call to the PCS 100 (step 1614), which permits the call to be answered (step 1616). When the call is finally terminated (step 1618), the 4G module is deactivated and/or placed in a sleep mode (step 1620).

In various implementations of method 1600, preconfigured location information and/or assisted global positioning (A-GPS) are used to determine the location of the PCS 100. Alternatively or additionally, the location of the PCS 100 may be determined using the preconfigured location and/or advanced forward link trilateration (AFLT) or multilateration. In some locations, such as a city skyscraper environment, many GPS systems are unable to work because the GPS receiver cannot see the GPS satellites. In the event A-GPS or AFLT cannot be used to determine location, the preconfigured location information may be used as a backup for determining the location of the PCS 100. For example, the PSAP may receive the preconfigured address information during the emergency call. In some cases, the PSAP may look up location information for the PCS 100, based on a phone number or identification number associated with the PCS 100.

Figure 17:
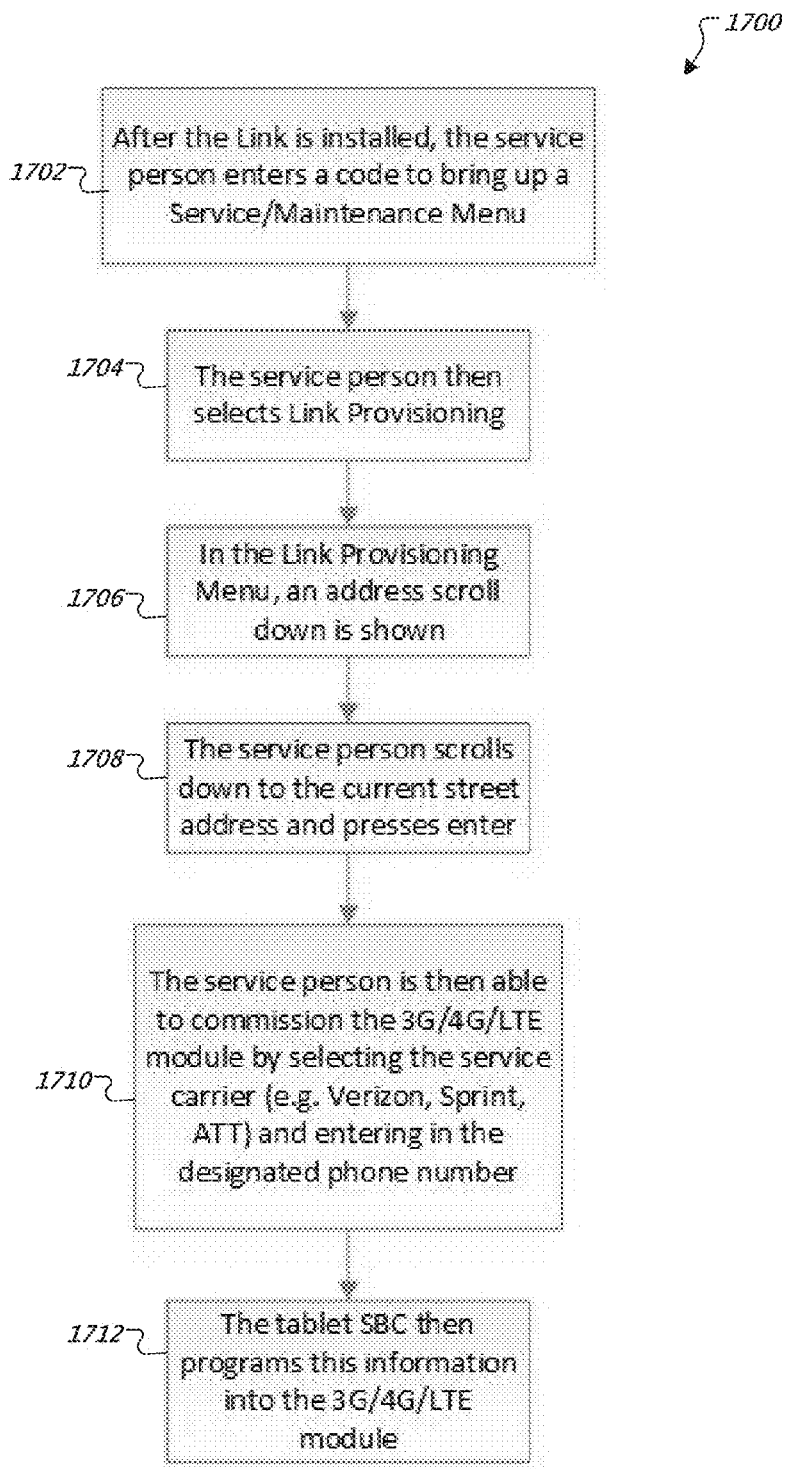
FIG. 17 is a flow chart of an example method of provisioning an address or location information into a PCS, in accordance with some embodiments.

FIG. 17 is a flow diagram showing an example method 1700 of configuring or provisioning the address of the PCS 100 into the E911 system 1400. This provisioning step is preferably done after the PCS 100 structure has been installed at a location and is being prepared for service. A service person unlocks a maintenance mode in the PCS 100 to access a service or maintenance menu (step 1702). The menu allows the service person to setup configurable parameters, including the location information of the PCS 100.

After selecting PCS 100 provisioning from the menu (step 1704), the service person is able to scroll down (step 1706) and select or input the address information (step 1708). In some examples, SBC 1402 has access to a database that includes the address information. In other instances, the location information may be a pseudo-database of pre-programmed locations (e.g., latitude/longitude combinations, cross-street addresses, or highway mile markers) that are known or understood by emergency dispatch. Using well-understood address information streamlines the emergency response process and avoids problems associated with emergency personnel attempting to interpret A-GPS or other address information that may be confusing or inaccurate. After selecting the address for the PCS 100, the service person may select a service carrier and enter a designated phone number for the PCS 100 (step 1710). The SBC 1402 may then program the phone number and address information into the wireless phone module 1404 (step 1712).

Figure 18:
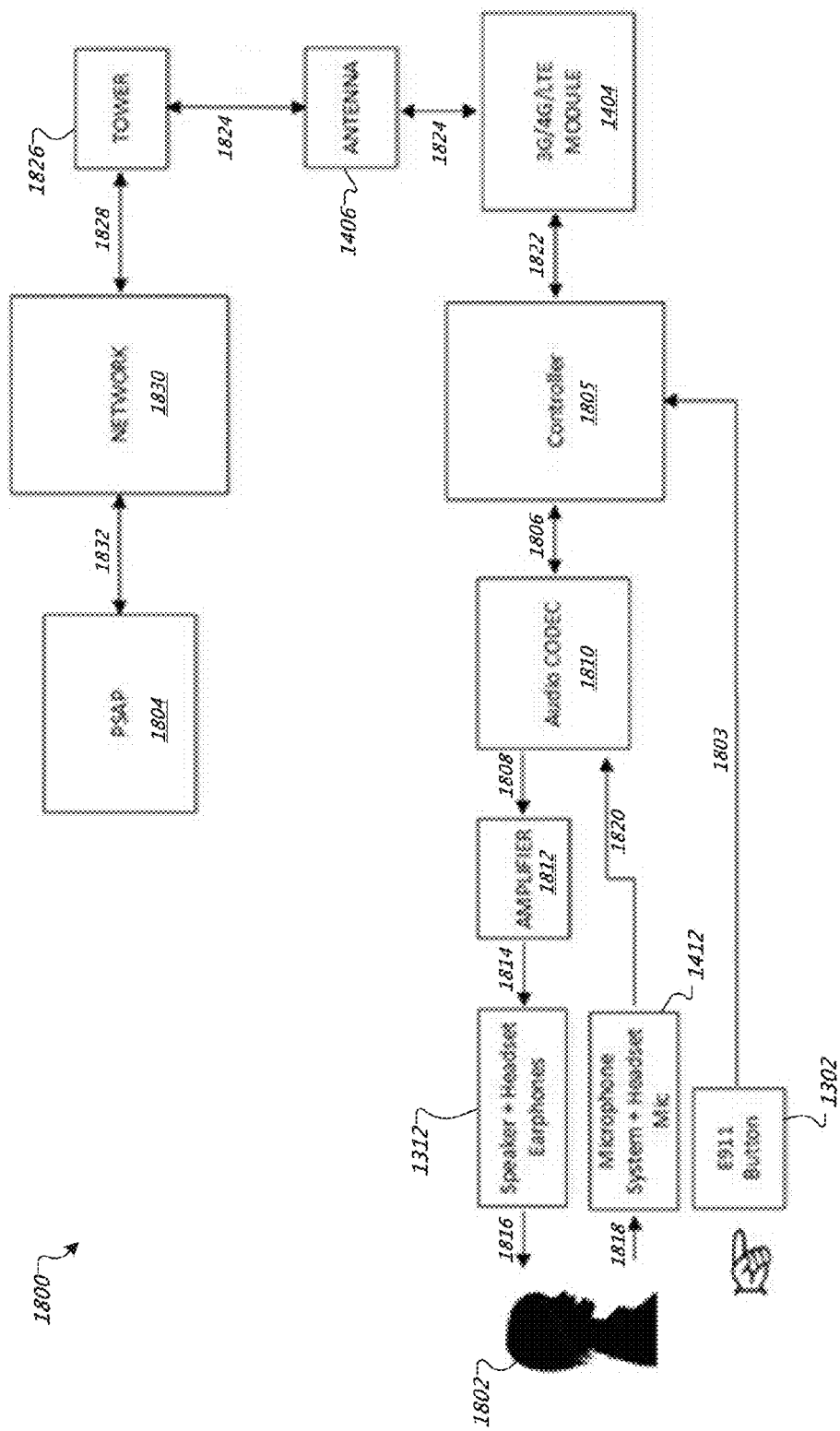
FIG. 18 is a schematic block diagram of a system of transmitting audio data between a user of a PCS and a public safety answering point, in accordance with some embodiments.

FIG. 18 is a schematic diagram of an example system 1800 for exchanging audio data between a user 1802 of the PCS 100 and an operator at the PSAP 1804. A call is placed when user 1802 presses the emergency call button 1302 (step 1802) and a digital signal 1803 is detected by a controller 1805, which may be or include the SBC 1402. When the call is placed, the operator's voice can be heard on the speaker 1312. A digital voice signal 1806 for the operator is converted to an analog voice signal 1808 by a CODEC 1810. The analog voice signal 1808 is run through an amplifier 1812 to produce an amplified signal 1814, so the speaker output 1816 is loud enough to be heard over street noise. To respond to the operator, the user 1802 projects a voice 1818 into the microphone 1412. The microphone 1412 generates an analog signal 1820 that is digitized by the CODEC 1810 to generate the digital signal 1806 of the user's voice. The controller 1805 runs a noise canceling algorithm on the digital signal 1806, to remove background noise.

In various examples, the controller 1805 and the wireless phone module 1404 (e.g., using 3G, 4G, and/or LTE) trade off taking control of a digital audio bus 1822. When the controller 1805 wants to send digital audio from the user 1802 to the wireless phone module 1404, the controller 1805 preferably becomes the master and the wireless phone module 1404 becomes the slave. When the wireless phone module 1404 wants to send digital audio from the PSAP 1804 to the controller 1805, the wireless phone module 1404 preferably becomes the master and the controller 1805 becomes the slave.

The wireless phone module 1404 transmits and receives RF signals 1824 to and from the antenna 1406 located on top of the PCS 100. RF signals (1824) are transmitted and received from one or more cell towers 1826 that are digitally connected 1828 to a phone network 1830 that is digitally connected 1832 to the PSAP 1804.

In various implementations, the E911 system may be configured to place wireless and/or wired calls. The wired calls may be made using voice over internet protocol (VOIP) or a conventional wire telephone line.

Figure 19:
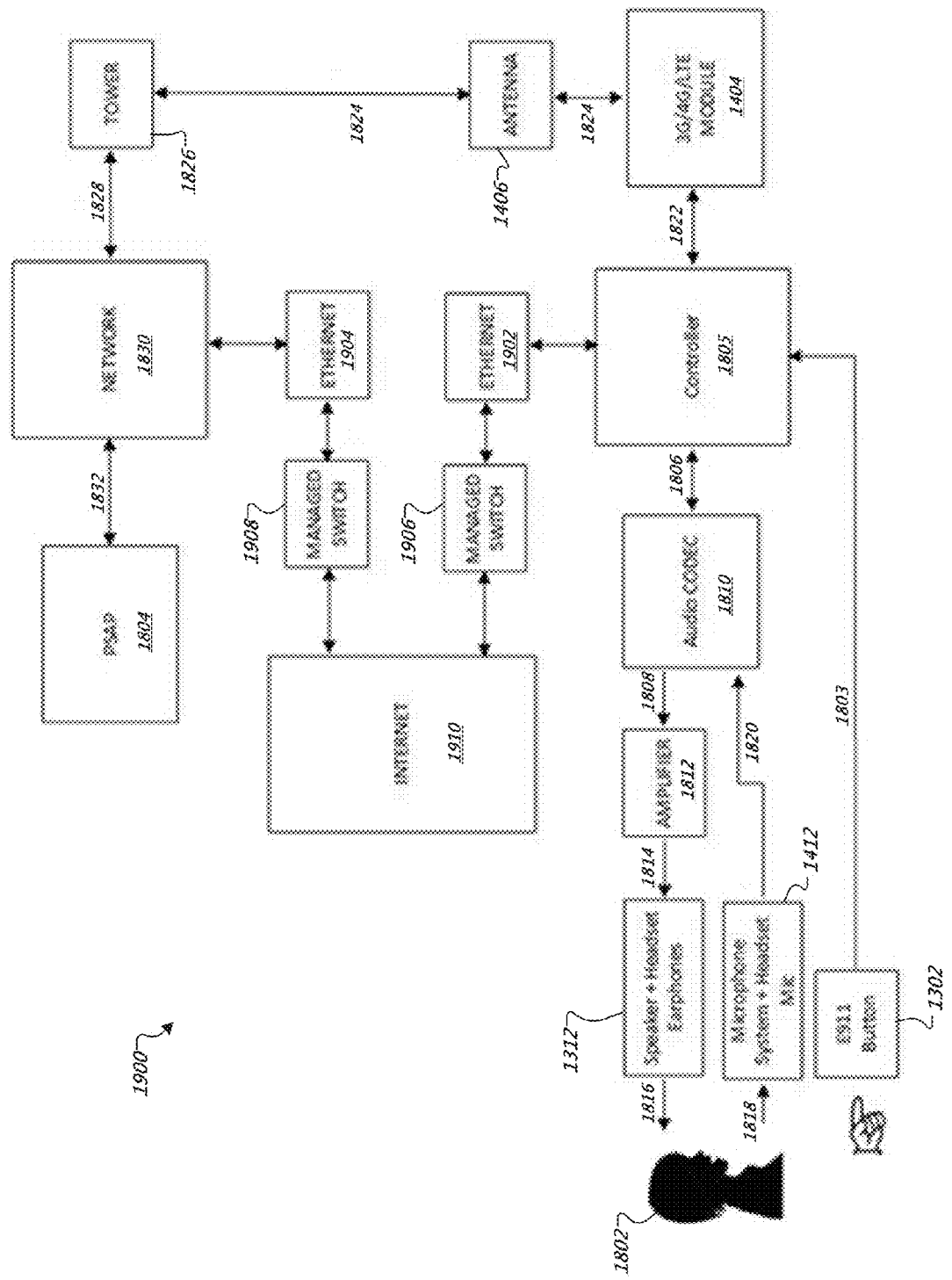
FIG. 19 is a schematic block diagram of a system of transmitting audio data between a user of a PCS and a public safety answering point, in accordance with some embodiments.

FIG. 19 is a schematic diagram of an alternative system 1900 of using wireless technology and/or VOIP to transfer audio data between the user 1802 and the operator at the PSAP 1804. Many of the components of system 1900 are the same as in system 1800, including the wireless phone module 1404, the antenna 1406, and the cell towers 1826, for placing wireless calls. System 1900, however, also includes a first Ethernet controller 1902, a second Ethernet controller 1904, a first managed switch 1906, and a second managed switch 1908, for transferring audio data over an Internet 1910. The controller 1805 exchanges digital audio data with the first Ethernet controller 1902, which transmits and receives digital audio data with the first managed switch 1906. Digital data is transferred between the first and second managed switches 1906, 1908 over the Internet 1910. The second Ethernet controller 1904 exchanges audio data with the second managed switch 1908 and the phone network 1830. Audio data is transmitted to and from the PSAP 1804 using the phone network 1830.

In preferred implementations, the E911 system 1400 uses the wireless method 1800 depicted in FIG. 18 as a primary method of placing an E911 call and the wired VOIP method 1900 depicted in FIG. 19 as a back-up. In certain instances, if an error is detected in the wireless phone module 1404 or other wireless system component, the E911 system 1400 may switch to a wired VOIP call as a back-up.

In preferred examples, while the system is on back-up battery power, the E911 controller 1805 periodically tests the wireless phone module 1404 to determine if the wireless phone module 1404 is able to communicate with a cell tower. This relatively simple test may be the same as or similar to picking-up a telephone to see if it has a "dial tone."

Alternatively or additionally, any errors associated with the wireless phone module 1404 or other wireless components may be detected at runtime. For example, if the wireless phone module 1404 is unable to connect to the phone network 1830 for any reason, or if wireless calls are being dropped, the E911 system may automatically switch to a VOIP call.

In some implementations, the E911 system 1400 uses wired VOIP as the primary method of placing E911 calls and uses the wireless phone module 1404 as the back-up. One advantage of this approach is simplicity. The PCS 100 preferably uses wired VOIP calls for ordinary, non-emergency calls, so continued use of wired VOIP for emergency calls is consistent with normal operating procedures. For wired VOIP emergency calls, PCS 100 location information can be transmitted via the Internet using techniques described herein and with respect to FIG. 15. In certain examples, GPS information can be obtained from the wireless module 1404 (e.g., using cell tower triangulation) and transmitted via the Internet using techniques described herein and with respect to FIG. 16.

In some embodiments, the power distribution system keeps the E911 system 1400 powered during power loss. As those skilled in the art can appreciate, the E911 system 1400 provides critical functionality to the PCS 100 and should be operational in the event of a power loss. In preferred examples, the E911 system 1400 can be powered up to 24 hours on the back-up battery.

Figure 20:
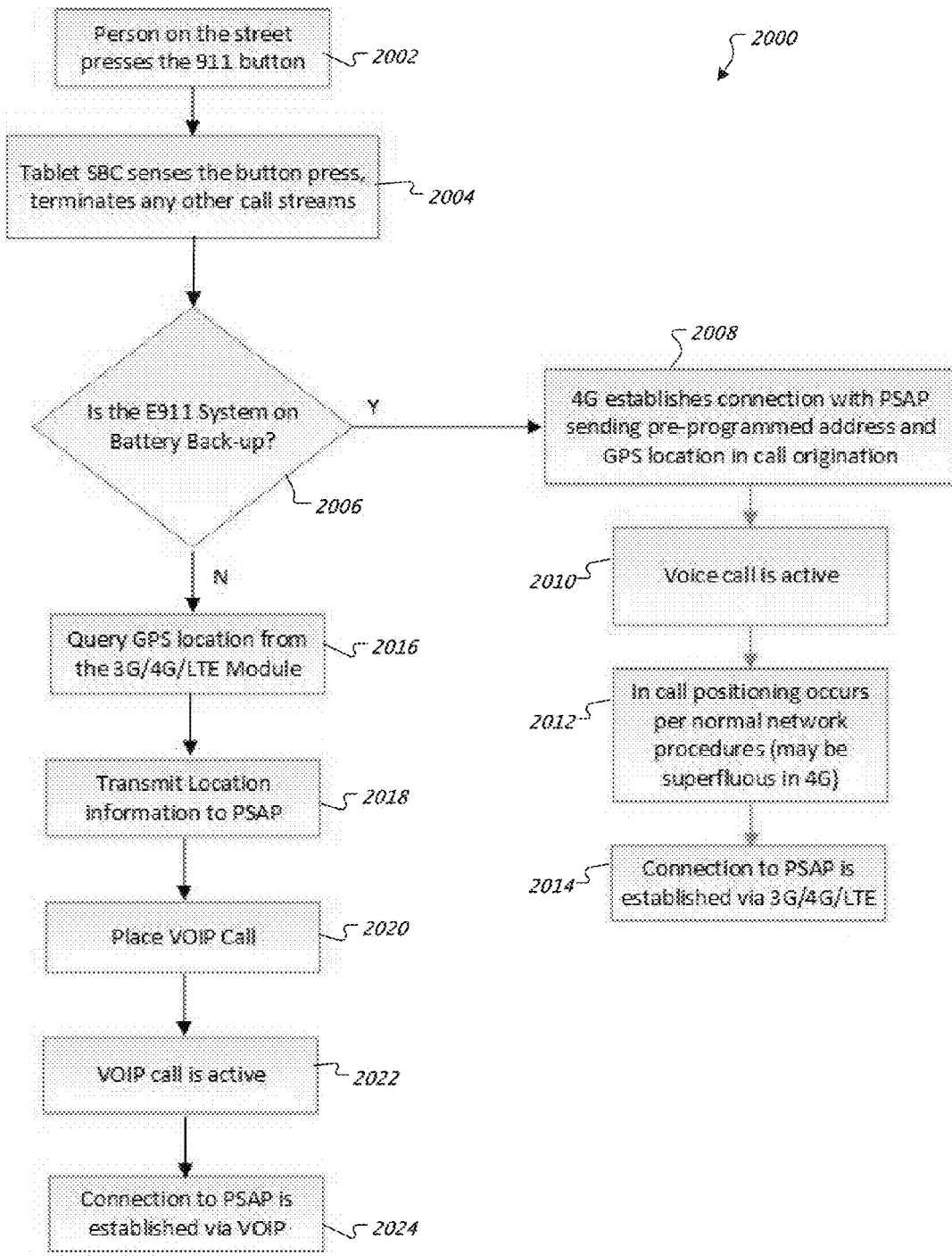
FIG. 20 is a flow chart of an example method of making an emergency call on a PCS when the PCS is on battery back-up, in accordance with some embodiments.

FIG. 20 is a flowchart of an example method 2000 of operating the E911 system on a battery back-up. When a person on the street presses the emergency call button 1302 (step 2002), the E911 system 1400 may terminate any other call stream that is active in the PCS 100 (step 2004). The E911 system 1400 then checks to see if the PCS 100 is on battery back-up (step 2006) and, if so, switches from placing a VOIP call to placing a wireless call. Alternatively, the E911 system 1400 could switch from making a wireless call to making a VOIP call, but this approach may be less desirable from an energy consumption standpoint, as discussed below. For the wireless call, a wireless connection with the PSAP is made (step 2008) to activate the wireless call (step 2010). Location information is transmitted to the PSAP using techniques described herein (step 2012). The wireless call connection may be established using 3G, 4G, and/or LTE (step 2014). For the VOIP call, location information may be obtained from the wireless phone module 1404 (step 2016) and transmitted to the PSAP (step 2018). The VOIP call is then placed (step 2020) and becomes active (step 2022) to achieve a connection with the PSAP (step 2024).

Those skilled in the art can appreciate that the battery back-up should minimize power consumption to preserve battery life. In general, networking equipment (e.g., for VOIP calls) consumes power at a high rate, and putting such equipment on battery back-up could deplete the battery in a short period of time. Preferably, when on battery backup, the E911 system 1400 consumes power only when a wireless call is being made. Other power saving techniques, such as dimming displays and putting processors in sleep mode (e.g., when no E911 call is being made), may also help extend battery life.

Figure 21:
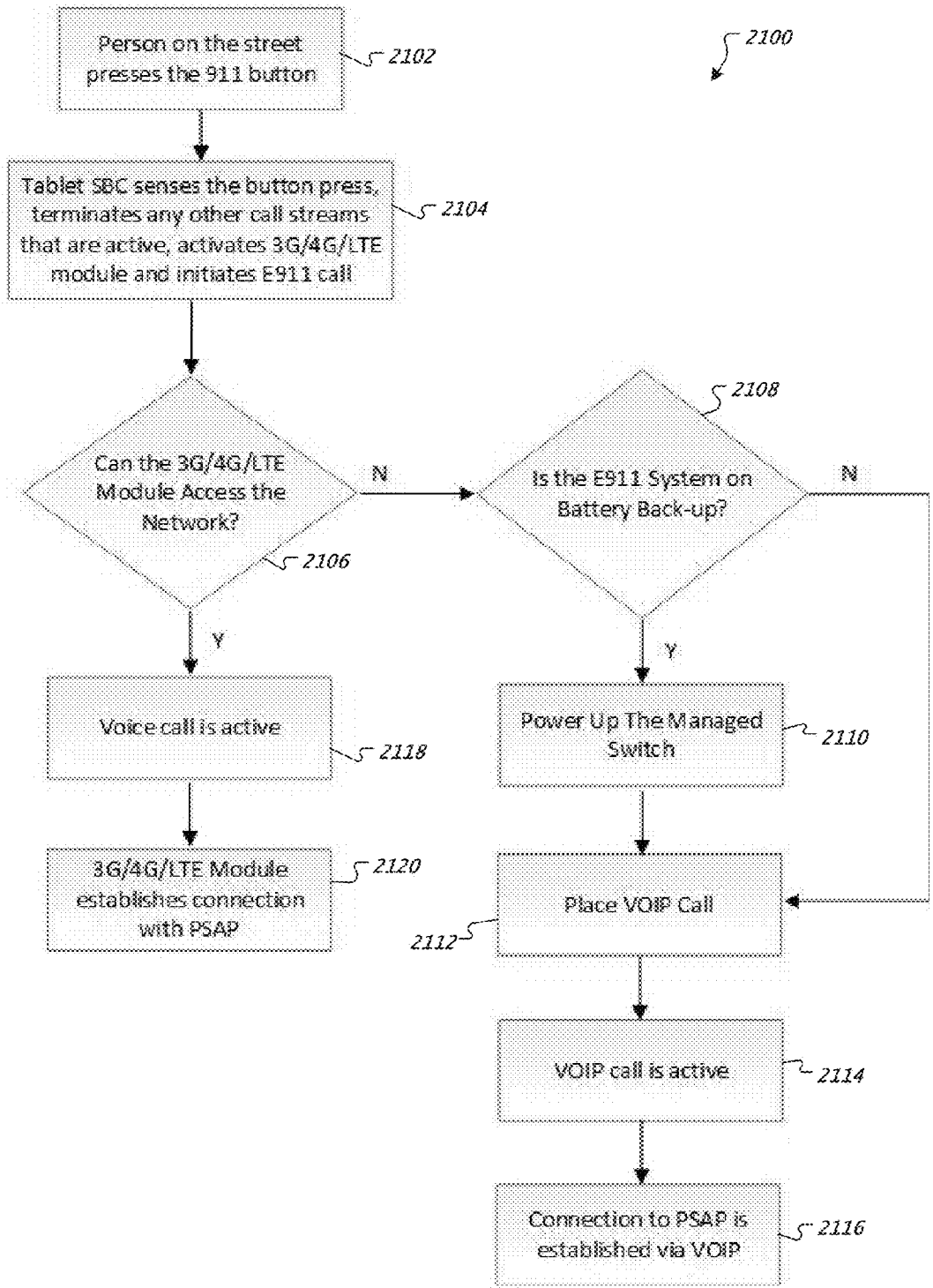
FIG. 21 is a flow chart of an example method of using VOIP to make an emergency call from a PCS when a cellular phone connection is not available and/or the PCS is on battery back-up, in accordance with some embodiments.

FIG. 21 is a flowchart of a method 2100 of placing an E911 call when the PCS 100 is on battery backup (e.g., due to a power outage). When a person on the street presses the emergency call button 1302 (step 2102), the E911 system 1400 may terminate any other call stream that is active in the PCS 100 (step 2104). The SBC 1402 then determines if the wireless phone module 1404 is able to connect to the cellular phone network (step 2106). If a connection to the cellular phone network is not available, the SBC 1402 then determines if the PCS 100 is on back-up battery power (step 2108). If the PCS 100 is on back-up battery power, the SBC 1402 powers up networking equipment to enable a VOIP call (step 2110). An E911 call is placed (step 2112) and becomes active (step 2114) to establish a VOIP connection with the PSAP (step 2116). Once the call is complete, the SBC 1402 may power down the networking equipment to conserve power. Alternatively, if the PCS 100 is not on back-up battery power, the VOIP connection with the PSAP is established without having to power up the networking equipment at step 2110. Also, if it is determined at step 2106 that a connection to the cellular phone network is available, a wireless E911 call is made (step 2118) to establish a connection with the PSAP (step 2120).

In the event of a black-out or power outage, some cell towers may not have power and/or may be unavailable to carry cell phone calls. A backhaul system, however, may still have power or be on a back-up system and may be available to carry VOIP calls in certain circumstances.

In some examples, the VOIP calls described herein may be replaced by other types of telephony or Internet telephony. For example, conventional wireline telephone calls may be used instead of VOIP calls. Such wireline telephone calls may consume little power and be a good option in the event of a power outage or loss of a cell phone connection and/or an Internet connection.

Figure 22:
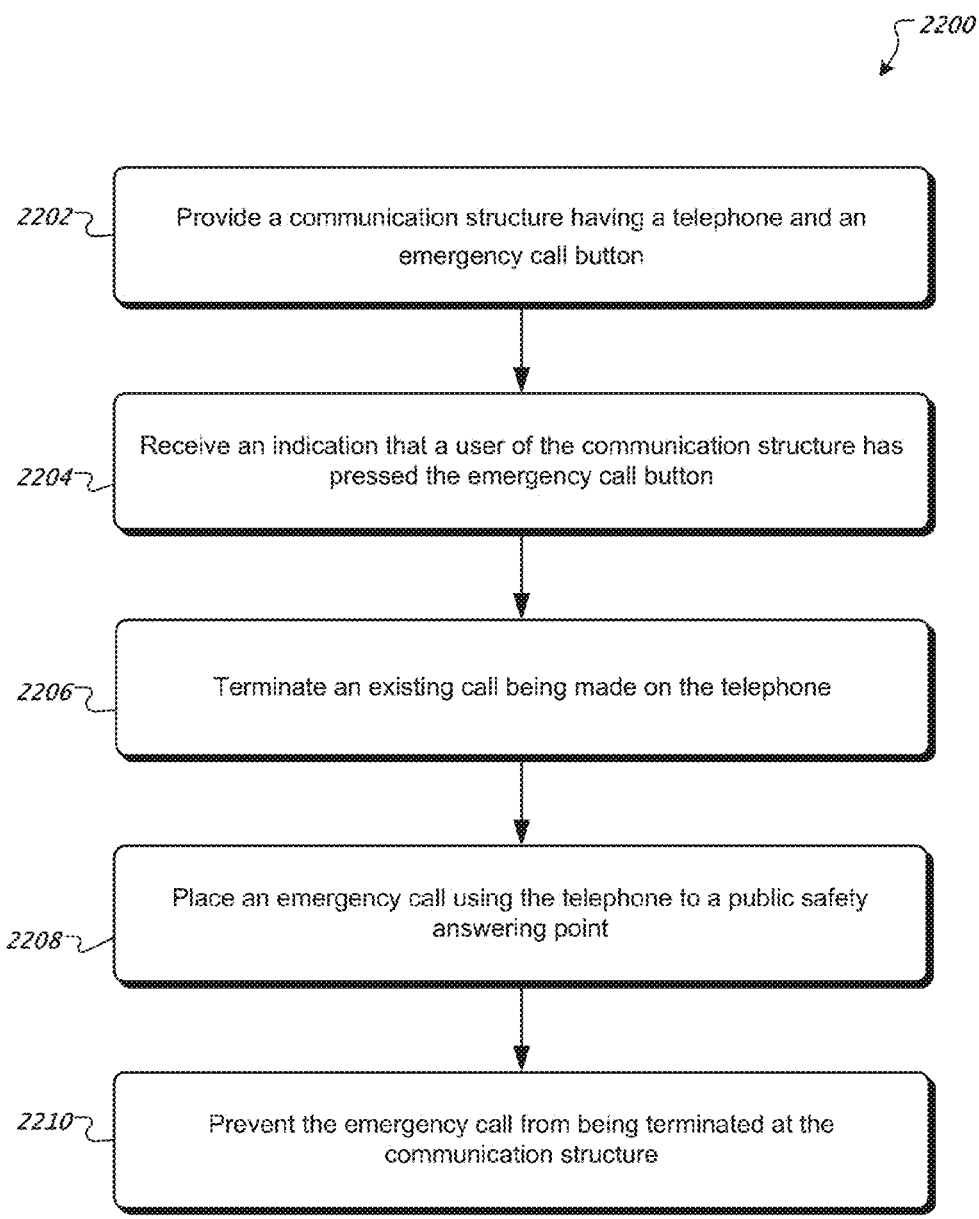
FIG. 22 is a flowchart of an example method of placing an emergency phone call from a PCS.

FIG. 22 is a flowchart of an example method 2200 of placing an emergency phone call. A PCS is provided (step 2202) that includes a telephone and an emergency call button. The telephone may be or include, for example, a wireline telephone, a wireless telephone, and/or a voice over Internet protocol telephone. In indication is received (step 2204) that a user of the PCS has pressed the emergency call button. An existing call being made on the telephone is terminated (step 2206). An emergency call is placed (step 2208) using the telephone to a public safety answering point. The PCS prevents (step 2210) the emergency call from being terminated at the PCS.

Further Description of Some Embodiments

Embodiments have been described in which a personal communication structure is used to place emergency phone calls. The various systems, methods, and processes outlined herein can use or be coded as software that is executable on one or more processors that employ one of a variety of operating systems or platforms. Additionally, such software can be written using any of a number of suitable programming languages and/or programming or scripting tools, and also can be compiled as executable machine language code or intermediate code that is executed on a framework or virtual machine. Also, the acts performed as part of the techniques described herein can be performed in any suitable order.

In this respect, the systems and methods can use or be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various techniques discussed above. The computer readable medium or media can be non-transitory. The computer readable medium or media can be transportable, such that the program or programs stored thereon can be loaded onto one or more different computers or other processors to implement various aspects of the present invention as discussed above. The terms "program" or "software" are used herein in a generic sense to refer to computer code or set of computer-executable instructions that can be employed to program a computer or other processor to implement various aspects described in the present disclosure. Additionally, it should be appreciated that according to one aspect of this disclosure, one or more computer programs that when executed perform techniques described herein need not reside on a single computer or processor, but can be distributed in a modular fashion amongst a number of different computers or processors to implement various aspects of the present invention.

Computer-executable instructions can be in many forms, such as program modules, executed by one or more computers or other devices. Generally, program modules include routines, programs, objects, components, data structures, etc. that perform particular tasks or implement particular abstract data types. Typically the functionality of the program modules can be combined or distributed as desired in various embodiments.

Also, data structures can be stored in computer-readable media in any suitable form. For simplicity of illustration, data structures can be shown to have fields that are related through location in the data structure. Such relationships can likewise be achieved by assigning storage for the fields with locations in a computer-readable medium that conveys relationship between the fields. However, any suitable mechanism can be used to establish a relationship between information in fields of a data structure, including through the use of pointers, tags or other mechanisms that establish a relationship between data elements.

In some embodiments the technique(s) can be implemented as computer instructions stored in portions of a computer's random access memory to provide control logic that affects the processes described above. In such an embodiment, the program can be written in any one of a number of high-level languages, such as FORTRAN, PASCAL, C, C++, C#, Java, JavaScript, Tcl, or BASIC. Further, the program can be written in a script, macro, or functionality embedded in commercially available software, such as EXCEL or VISUAL BASIC. Additionally, the software can be implemented in an assembly language directed to a microprocessor resident on a computer. For example, the software can be implemented in Intel 80x86 assembly language if it is configured to run on an IBM PC or PC clone. The software can be embedded on an article of manufacture including, but not limited to, "computer-readable program means" such as a floppy disk, a hard disk, an optical disk, a magnetic tape, a PROM, an EPROM, or CD-ROM.

Embodiments have been described in which various aspects of the techniques described herein are applied to a personal communication structure (PCS). In some embodiments, aspects of the techniques described herein may be applied to any suitable structure including, without limitation, a kiosk (e.g., an interactive kiosk), pay station (e.g., parking pay station), automated teller machine (ATM), article of street furniture (e.g., mailbox, bench, traffic barrier, bollard, telephone booth, streetlamp, traffic signal, traffic sign, public transit sign, public transit shelter, taxi stand, public lavatory, fountain, watering trough, memorial, sculpture, waste receptacle, fire hydrant, vending machine, utility pole, etc.), etc.

Various aspects of the present disclosure can be used alone, in combination, or in a variety of arrangements not specifically described in the foregoing, and the invention is therefore not limited in its application to the details and arrangement of components set forth in the foregoing description or illustrated in the drawings. For example, aspects described in one embodiment can be combined in a suitable manner with aspects described in other embodiments.

TERMINOLOGY

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e., "one or the other but not both") when preceded by terms of exclusivity, such as "either," "one of," "only one of," or "exactly one of" "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

EQUIVALENTS

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method of placing an emergency phone call, the method comprising:
   providing a communication structure comprising:
      a frame mounted to ground in a location selected from the group consisting of a public place and a semi-public place;
      a telephone attached to the frame; and
      an emergency call button attached to the frame and in communication with the telephone;
   receiving an indication that a user of the communication structure has pressed the emergency call button, and, in response:
      terminating an existing call being made on the telephone;
      placing an emergency call using the telephone to a public safety answering point;
      preventing the emergency call from being terminated at the communication structure; and
      maintaining at least one service for at least one other user of the communication structure when the emergency call is placed, the at least one service selected from the group consisting of small cell service, Wi-Fi service, and combinations thereof.

2. The method of claim 1, wherein the communication structure is accessible to the general public.

3. The method of claim 1, wherein preventing the emergency call from being terminated comprises inactivating at least one button associated with the communication structure.

4. The method of claim 1, further comprising, in response to a premature termination of the emergency call, receiving a call-back from the public safety answering point at the telephone.

5. The method of claim 1, wherein the communication structure is configured with at least one of a call-back number and a call-back time period.

6. The method of claim 1, further comprising determining that a wireless communication system is not available, and, in response, placing the emergency call using voice over Internet protocol.

7. The method of claim 1, further comprising:
   receiving an instruction from the public safety answering point, the instruction comprising advice for handling an emergency associated with the emergency call; and
   presenting the instruction on a display of the communication structure.

8. The method of claim 7, wherein the instruction comprises at least one of an image and a video.

9. The method of claim 1, further comprising:
obtaining an image or a video using a camera in communication with the communication structure; and
sending the image or the video to the public safety answering point.

10. The method of claim 1, wherein the telephone is configured to receive phone calls only from a public safety answering point.

11. The method of claim 10, wherein the telephone is configured to receive phone calls from the public safety answering point only within a predetermined period of time after an emergency call has ended.

12. A communication structure comprising:
a frame mounted to ground in a location selected from the group consisting of a public place and a semi-public place;
a telephone attached to the frame;
an emergency call button attached to the frame; and
a controller in communication with the telephone and the emergency call button,
wherein, when the emergency call button is pressed, the controller is configured to:
(i) terminate an existing call being made on the telephone;
(ii) place an emergency call using the telephone to a public safety answering point;
(iii) prevent the emergency call from being terminated at the communication structure; and
(iv) maintain at least one service for at least one other user of the communication structure when the emergency call is placed, the at least one service selected from the group consisting of small cell service, Wi-Fi service, and combinations thereof.

13. The communication structure of claim 12, wherein the communication structure is accessible to the general public.

14. The communication structure of claim 12, wherein, to prevent the emergency call from being terminated, the controller is configured to inactivate at least one button associated with the communication structure.

15. The communication structure of claim 12, wherein, when the emergency call is prematurely terminated, the communication structure is configured to receive a call-back from the public safety answering point at the telephone.

16. The communication structure of claim 12, wherein the communication structure is configured with at least one of a call-back number and a call-back time period.

17. The communication structure of claim 12, wherein, when a wireless communication system is not available, the communication structure is configured to place the emergency call using voice over Internet protocol.

18. The communication structure of claim 12, further comprising a display, wherein the communication structure is configured to (i) receive an instruction from the public safety answering point, the instruction comprising advice for handling an emergency associated with the emergency call, and (ii) present the instruction on the display.

19. The communication structure of claim 18, wherein the instruction comprises at least one of an image and a video.

20. The communication structure of claim 12, further comprising a camera for obtaining an image or a video of a scene near the communication structure, wherein the communication structure is configured to send the image or the video to the public safety answering point.

21. The communication structure of claim 12, further comprising an indicator configured to present an indication that an emergency phone call is in process, the indication selected from the group consisting of a flashing light, an E911 symbol, an emergency message, and an emergency instruction.

22. The communication structure of claim 12, wherein the telephone is configured to receive phone calls only from a public safety answering point.

23. The communication structure of claim 22, wherein the telephone is configured to receive phone calls from the public safety answering point only within a predetermined period of time after an emergency call has ended.

* * * * *